(12) United States Patent
Negishi et al.

(10) Patent No.: US 6,621,939 B1
(45) Date of Patent: Sep. 16, 2003

(54) SCENE DESCRIPTION GENERATING APPARATUS AND METHOD, OBJECT EXTRACTING METHOD, AND RECORDING MEDIUM

(75) Inventors: Shinji Negishi, Kanagawa (JP); Hideki Koyanagi, Kanagawa (JP); Yoichi Yagasaki, Tokyo (JP); Takefumi Nagumo, Tokyo (JP)

(73) Assignee: Sony Corporation, Tokyo (JP)

( * ) Notice: Subject to any disclaimer, the term of this patent is extended or adjusted under 35 U.S.C. 154(b) by 577 days.

(21) Appl. No.: 09/592,008

(22) Filed: Jun. 12, 2000

(30) Foreign Application Priority Data

Jun. 14, 1999 (JP) .......................................... 11-167225

(51) Int. Cl.[7] .............................................. G06K 9/36
(52) U.S. Cl. ...................................... 382/291; 382/243
(58) Field of Search ................................ 382/276–294, 382/103–107, 243; 345/681, 475

(56) References Cited

U.S. PATENT DOCUMENTS

| | | | | |
|---|---|---|---|---|
| 6,072,478 A | * | 6/2000 | Kurihara et al. | 345/473 |
| 6,124,864 A | * | 9/2000 | Madden et al. | 345/475 |
| 6,128,396 A | * | 10/2000 | Hasegawa et al. | 382/103 |
| 6,396,957 B1 | * | 5/2002 | Park et al. | 382/243 |
| 6,512,793 B1 | * | 1/2003 | Maeda | 382/243 |

* cited by examiner

*Primary Examiner*—Jingge Wu
(74) *Attorney, Agent, or Firm*—Frommer Lawrence & Haug LLP; William S. Frommer

(57) ABSTRACT

A scene description generating apparatus and method, an object extracting method, and a recording medium extract an object from an input image. Positional information on the extracted object is output. Based on the positional information, scene description information about a placement position of the object in a scene is generated. When the object is deformed, reference to the positional information is made, and the scene description information is generated in which the object deformation is reflected. Accordingly, the object is placed at a desirable position in the scene.

28 Claims, 21 Drawing Sheets

TEXTURE MAP AND TEXTURE COORDINATES IN FRAME 1

TEXTURED SURFACE OF SCENE OBJECT IN SCENE 1

TEXTURE MAP AND TEXTURE COORDINATES IN FRAME 2 (NO TRANSFORMATION)

TEXTURED SURFACE OF SCENE OBJECT IN SCENE 2

TEXTURE COORDINATE AXES ARE ENLARGED/
REDUCED AND APPLIED TO TEXTURE MAP

FIG. 22

```
Group {                          → GROUPING NODE OF ENTIRE SCENE
  children [                     → START OF DESCRIPTION OF GROUPED CHILD NODE
    Transform2D {                → GROUPING NODE DESIGNATING COORDINATE TRANSFORMATION
      translation x1 y1          → DESIGNATE PLACEMENT POSITION
      children [                 → START OF DESCRIPTION OF PLACED CHILD NODE
        Shape {                  → OBJECT TO BE INCORPORATED INTO SCENE
          geometry Bitmap { }    → SCENE OBJECT ON WHICH TEXTURE IMAGE IS TO BE DISPLAYED
          appearance Appearace { → DESIGNATE SURFACE CHARACTERISTIC OF SCENE OBJECT
            texture ImageTexture { url }  → DESIGNATE IMAGE OBJECT
          }
        ...
      }
    }
    Transform2D { ...
    ]}
]}
```

SCENE DESCRIPTION GENERATING APPARATUS AND METHOD, OBJECT EXTRACTING METHOD, AND RECORDING MEDIUM

BACKGROUND OF THE INVENTION

1. Field of the Invention

The present invention relates to scene description generating apparatuses and methods for placing static image signals, moving image signals, and graphic data in a screen and for describing a new scene, to object extracting methods, and to recording media.

2. Description of the Related Art

FIG. 19 shows conventional scene description technology for placing static image signals, moving image signals, and graphic data in a screen and for describing a new scene. When input images and graphic data are to be displayed as a scene combining one or more input data, it is necessary to provide additional information for designating what the constructed scene will be. This additional information is referred to as a scene description (information). The scene description (information) is used to place a part (referred to as an "object" to be input in a scene. Referring to FIG. 19, an object A02 and an object A03 are displayed based on a scene description (information) A00, thus obtaining a scene A04. Although the two-dimensional scene description is illustrated by way of example in FIG. 19, there are cases in which a three-dimensional scene is displayed on a two-dimensional display device by describing the three-dimensional scene and projecting the scene onto a two-dimensional plane. When a scene combining one or more objects is represented based on a scene description, an entire screen A01 displaying an input static image or a moving image may be used. Alternatively, a desired portion of the scene may be separated as an object A02. This separation is referred to as segmentation.

FIG. 20 shows the structure of a conventional editing system for performing segmentation and generating a scene description. Image processing of an input image or graphic data is performed independently of generating the scene description. In an image processor B00, graphic data B01 is transformed to an object B04 by a segmentation unit B02. Segmentation may be performed by various methods including a chroma-key method for separating a background with a specific color component, a method for cutting the contour of an object based on the luminance level gradient, and a method for designating the contour by manual operation. A segmented object may be encoded by an encoder B03 indicated by a dotted line using, for example, an encoding system conforming to the ISO14496-2 standard. In contrast, a scene description processor B05 generates a scene description B07 based on a designation of what the constructed scene will be.

There are various types of scene description, including the ISO14496-1 standard MPEG-4 scene description, virtual reality modeling language (VRML) conforming to the ISO14772-1 standard, hypertext markup language (HTML) widely used in the Internet, and multimedia and hypermedia information coding expert group (MHEG) conforming to the ISO13522-5 standard.

Referring to FIGS. 21 to 23, the ISO14496-1 standard MPEG-4 scene description is illustrated by way of example to describe the structure, the contents, and an example of a scene description. FIG. 21 shows the structure of a scene description, FIG. 22 shows the contents of a scene description, and FIG. 23 shows an example of a scene. A scene description is represented by basic description units referred to as nodes. A node is a unit for describing an object, a light source, and an object's surface characteristics, and includes data referred to as a field for designating node characteristics and attributes. For example, referring to FIG. 21, a "Transform2D" node is a node capable of designating two-dimensional coordinate transformation, and includes a "translation" field shown in FIG. 22, designating placement, such as translation. There are fields that can designate other nodes. Hence, a scene description has a tree structure. When an object is to be placed in a scene, the scene description is grouped into a node representing the object and a node representing attributes, as shown in FIG. 22. The scene description is further grouped into a node representing placement. The contents of the scene description shown in FIG. 22 are described below. First, "Group{" is a grouping node of an entire scene, and "children" indicates the start of a description of a child node. The text "Transform2D" is a grouping node for designating coordinate transformation, and "translation x1 y1" designates the placement position. The text "children[" indicates the start of a description of a child node to be placed, and "Shape{" designates incorporation of an object into the scene. The text "geometry Bitmap{}" indicates a scene object on which a texture image is to be displayed, "appearance Appearance{" designates a surface characteristic of the scene object, and "texture ImageTexture{url}" designates an image object used as a texture. In accordance with the contents of the scene description, an image object is placed as shown in FIG. 23. An object indicated by the "Shape" node is designated by the parent node, i.e., the "Transform2D" node, to be translated. FIG. 23 shows an example of this. Referring to FIG. 23, an object in an input image is segmented every rectangular region containing the object by the segmentation unit B02 shown in FIG. 20. The object B04 is then placed in the scene based on a designation in the scene description B07 generated by the scene description generator B06.

Next, an image object encoding system is described using ISO14496-2 standard MPEG-4 Video by way of example. Referring to FIG. 24, an elliptical object D01 in an input image D00 is segmented from a background object D03, and the object D01 is encoded. When encoding the object D01, a region D02 including the object D01 is set. In MPEG-4 Video, a rectangular region is used. Outside the rectangular region is not encoded. Encoding is performed in small block units. Hereinafter a block is referred to as an encoding block. When an encoding block, such as an encoding block D05, does not include object data, the encoding block is required to encode only a flag representing "there is no data to be encoded". When an encoding block, such as an encoding block D06, includes both an object region and a region without an object, the pixel level of the region outside the object can be set to an arbitrary value and thus encoded. This is because the form (contour) of the object D01 is separately encoded, and data outside the object is ignored when decoding. In contrast, the background D03 is also an object. When encoding the background object D03, a rectangular region D04 including the object D03 is set. This rectangular region D04 covers an entire frame of the input image. The rectangular region D04 is encoded in the same manner as the object D01. Specifically, a shaded portion indicates an object to be encoded. Here, the entire frame of the input image is included in the rectangular region D04. When an encoding block D07 includes data inside and outside the object, outside the object can be set to an arbitrary value and thus encoded. When an encoding block D08 does not include object data, only a flag representing "there is no data to be encoded" is encoded.

Referring to FIG. 25, when an image object, such as MPEG-4 Video, is placed in a scene, a placement position of the object in scene coordinates is designated. The placement position is described in a scene description. The placement position can be designated in two-dimensional coordinates or in three-dimensional coordinates. Alternatively, the placement position can be designated based on alignment constraints, such as "placing an object at the lower left of the screen". In FIG. 25, the center of a rectangular region containing the object is used as a positional reference of the object. Alternatively, the centroid of the object or the upper left of the object can be used as the positional reference. Hence, the object is placed according to the reference position of the object.

When an object in an input moving image or graphic data is deformed, the object placed based on the scene description is shifted in the scene. In frame 1 in FIG. 25, an object segmented from an input image is placed based on a scene description designating the center of a rectangular region containing the object to be placed at a placement position a. In frame 2, the object is deformed, and the rectangular region containing the object is also deformed. Hence, the object, which does not move in the original input image or graphic data, is undesirably shifted in the described scene. It is thus desired that a part which does not move in the original input image or graphic data is not shifted in the described scene. When an object moves in the input image or graphic data, the conventional art is not capable of reflecting the object movement and of placing the object in the scene described by the scene description. Specifically, the conventional art fails to change the placement position of the object to a desired placement position b in the described scene.

In a scene description, an image or graphic data is not always regarded as an object. Sometimes such an image or graphic data is employed as a texture to be pasted on a surface of another object in a scene. FIG. 26 shows an example of pasting an image object on a surface of a cube. In ISO14496-1 standard MPEG-4 scene description, an image employed as a texture is regarded to be in a range from 0 to 1 in an s–t coordinate system, that is, a two-dimensional texture coordinate system. This is referred to as a texture map. When a texture is pasted on a surface of an object, the part of the texture map to be used is designated by texture coordinates. When a texture is to be pasted on a cube or on a rectangular prism, as in FIG. 26, a region corresponding to 0 to 1 in both s–t directions of the texture map is pasted on each separate side of the cube or the rectangular prism. When a segmented object is employed, and the object is deformed, as in frame 2 in FIG. 26, a region containing the object is also deformed. Hence, a picture frame of the texture image is deformed. Despite this deformed picture frame, the entire picture frame of the texture map ranging from 0 to 1 is employed. Thus the pasted texture is deformed, whereas the original object in the input image is transformed in a different manner. It is thus desired to display such an object in a described scene in the same manner as in the original input image or graphic data.

When an object obtained by segmenting a static image signal, a moving image signal, or graphic data is placed in a screen, and a new scene is described, the following problems occur due to deformation of the object in the image or the graphic data.

First, when the object is deformed, and a region containing the object is also deformed, the object is undesirably shifted in a scene described by a scene description. In addition, movement of the object in the input image or in the graphic data is not reflected in movement of the object in the scene.

Second, when a segmented image or graphic data is employed as a texture in a scene description, and when the object is deformed and a region containing the object is also deformed, the texture to be pasted is distorted in a scene described by the scene description. In addition, movement of the object in the input image or the graphic data is not reflected in movement of the texture.

SUMMARY OF THE INVENTION

Accordingly, it is an object of the present invention to provide a scene description generating apparatus and method and an object extracting method for solving the above problems, that is, for preventing generation of undesirable shifting or distortion in a scene described by a scene description even when an object in an input image or graphic data is deformed, and for reflecting movement of the object in the input image or the graphic data in movement of the object or in movement of the texture in the scene.

According to an aspect of the present invention, the foregoing objects are achieved through provision of a scene description generating apparatus and method including an object extracting step of extracting an object from an input image and outputting positional information on the extracted object. Based on the positional information output in the object extracting step, scene description information about a placement position of the object in a scene is generated in a scene description generating step. When the object is deformed, the positional information is referred to in the scene description generating step and the scene description information in which the object deformation is reflected is generated.

According to another aspect of the present invention, the foregoing objects are achieved through provision of a scene description generating apparatus and method including an object extracting step of extracting an object from an input image. In a positional information detecting step, positional information on the object extracted in the object extracting step is detected. Based on the positional information detected in the positional information detecting step, scene description information about a placement position of the object in a scene is generated in a scene description generating step. When the object is deformed, the positional information is referred in the scene description generating step and the scene description information in which the object deformation is reflected is generated.

According to another aspect of the present invention, the foregoing objects are achieved through provision of a recording medium for causing a scene description generating apparatus for generating scene description information on an object to execute a computer-readable program. The program includes an object extracting step of extracting the object from an input image and outputting positional information on the extracted object. Based on the positional information output in the object extracting step, the scene description information about a placement position of the object in a scene is generated in a scene description generating step. When the object is deformed, the positional information is referred to in the scene description generating step and the scene description information in which the object deformation is reflected is generated.

According to the present invention, when placing an object segmented from a static image signal, a moving image signal, or graphic data by an object extracting unit/step in a screen and describing a new scene, the object extracting unit, i.e., a segmentation unit, outputs positional information on a region containing the object in the input image or the graphic data. Based on the output positional information, a scene description generating unit/step determines a placement position of the object. Accordingly, even when the region containing the object is deformed or shifted, the object is placed at a desirable position in the scene described by the scene description. When the segmented object is used as a texture in the scene description, the scene description is generated in which texture coordinates are transformed based on the positional information output from the segmentation unit. Therefore, distortion of a texture pasted in the scene is prevented, and shifting of the object is reflected in the texture. Alternatively, texture distortion is prevented by changing the size of a scene object on which the texture is to be pasted or by changing the position of the texture.

When the positional information on the region containing the object in the image or the graphic data is included in data of the segmented object, the positional information is made equally available by means of a positional information detector to which the object data is input to detect the positional information. Hence, undesirable shifting or distortion in the scene is prevented.

When the region is determined so as to contain objects in frames of a plurality of images or graphic data and is segmented, the number of changes of the placement position is reduced, or changes are not necessary at all. In particular, when the region containing the object is set as a picture frame of the input image or the graphic data, it is not necessary to change the placement position.

BRIEF DESCRIPTION OF THE DRAWINGS

FIG. 22 is an illustration of contents of a scene description;

DESCRIPTION OF THE PREFERRED EMBODIMENTS

The present invention will be understood from the following description of the preferred embodiments taken in conjunction with the accompanying drawings. Several embodiments of editing systems for generating a scene description are described below. Although these editing systems are described as hardware, the editing systems are not limited to those embodiments. Alternatively, a program may include a scene description generating method and an object extracting method according to the present invention, and a computer may execute the program. Positional information (described hereinafter) and a scene description may be recorded in a recording medium, thus making the positional information and the scene description portable. Therefore, the editing systems can be easily constructed.

Figure 1:
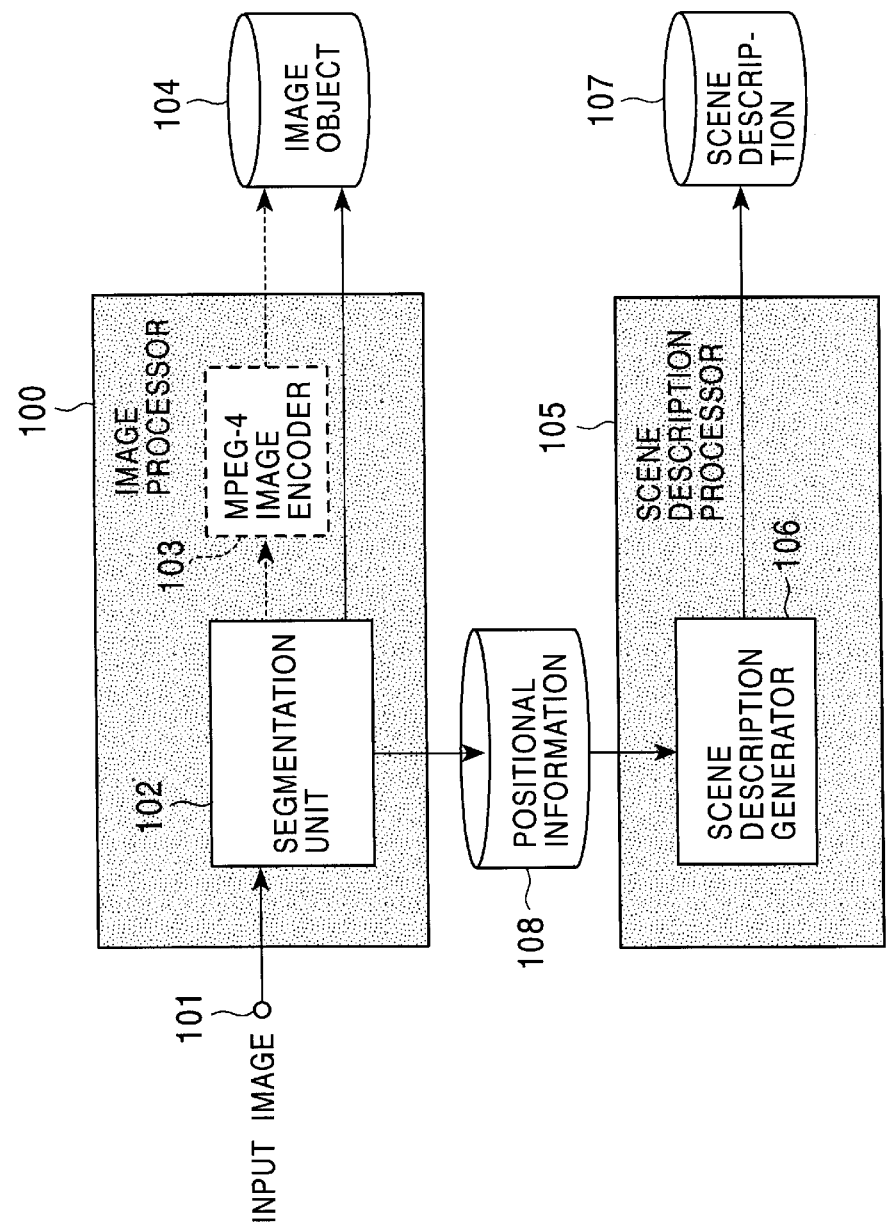
FIG. 1 is a block diagram of an editing system according to a first embodiment of the present invention.

Referring to FIGS. 1 to 3, an editing system according to a first embodiment of the present invention is described. The editing system includes an image processor 100 for processing an input image and a scene description processor 105 for describing a scene based on positional information generated by the image processor 100. Image processing and scene description are not performed independently of each other. Details are described hereinafter. Positional information 108 output from a segmentation unit 102 of the image processor is employed by a scene description generator 106 of the scene description processor 105.

An input image 101 is input to the image processor 100. The segmentation unit 102 segments the input image 101 as an image object 104. Segmentation is performed by a chroma-key method for separating a background with a specific color component, a method for cutting the contour of an object based on the luminance level gradient, a method for designating the contour by manual operation, or the like. The segmentation unit 102 of the present invention outputs the positional information 108, which includes the width and the height of a rectangular region containing the object and the position of the rectangular region in the input image 101. The segmented image object may be encoded by an MPEG-4 image encoder 103. In ISO14496-2 standard MPEG-4 Video, the width and the height of the rectangular region containing the object and the upper left position of the rectangular region are encoded for each image object corresponding to one frame of the input image. The segmentation unit 102 transfers these values to the image encoder 103 so as to be employed as the positional information 108 when generating a scene description. In contrast, the scene description generator 106 often generates a scene description 107 using ISO14496-1 standard MPEG-4 system based on a designation of what the constructed scene will be. Simultaneously, the scene description generator 106 refers to the positional information 108 output from the segmentation unit 102, and determines a position at which to place the object in the scene. By referring to the positional information 108, the object is thereby prevented from undesirably being shifted in the scene described by the scene description even when the object is deformed. When the image is employed as a texture, texture coordinate transformation is performed by referring to the positional information. This is described hereinafter.

Figure 2A:
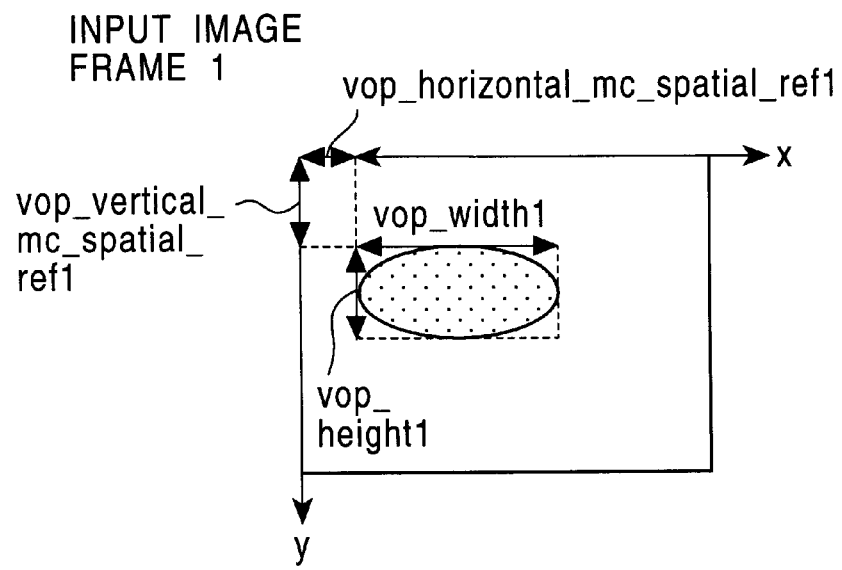
FIGS. 2A and 2B are illustrations of an example of positional information generated when an image object is segmented from an input image.
Figure 2B:
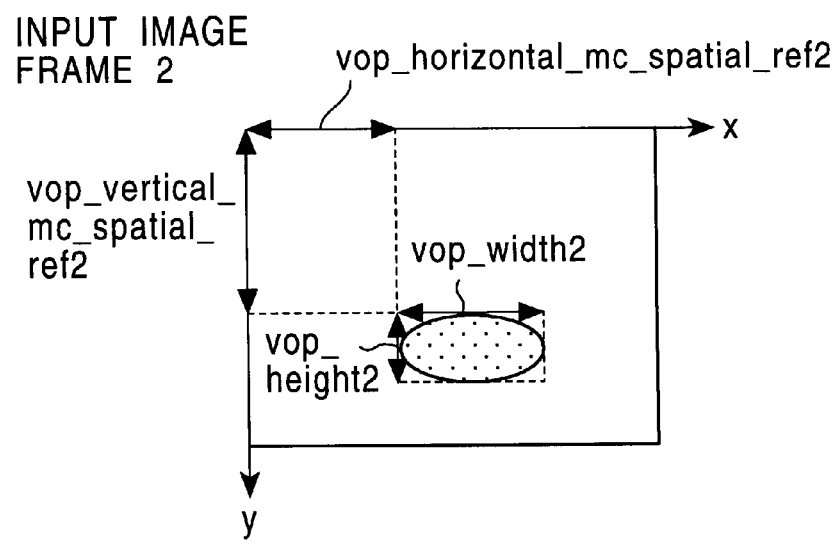

FIGS. 2A and 2B show an example of the positional information generated when the image object is segmented from the input image. The positional information includes the horizontal size vop_width and the vertical size vop_height of a rectangular region containing the object, and the upper left x-coordinate vop_horizontal_mc_spatial_ref and the y-coordinate vop_vertical_mc_spatial_ref of the input image. Between adjacent frames 1 (FIG. 2A) and 2 (FIG. 2B) of the input image, the object moves in the input image and is deformed, thus changing the size of the region containing the object. A variation in the horizontal size of the rectangular region is expressed by Δw, and a variation in the vertical size is expressed by Δh. These values represent variations caused by the object deformation. Based on the positional information, these values are obtained by the following:

$$\Delta w = vop\_width - vop\_width1$$

$$\Delta h = vop\_width - vop\_height1$$

Horizontal movement of the rectangular region containing the object is expressed by Δh_ref, and vertical movement is expressed by Δv_ref. These values represent variations caused by both the object deformation and the object movement. Based on the positional information, these values are obtained by the following:

$$\Delta h\_ref = vop\_horizontal\_mc_{spatial}\_ref2 - vop\_horisontal\_mc_{spatial}\_ref1$$

$$\Delta h\_ref = vop\_vertical\_mc_{spatial}\_ref2 - vop\_vertical\_mc_{spatial}\_ref1$$

As described in the related art, when objects are continuously placed in the scene at the same placement position, the objects in the scene are undesirably shifted. This undesirable shifting is not detected in the original input image. In order to prevent the undesirable shifting, the scene description generator 106 of the first embodiment refers to the positional information 108 output from the segmentation unit 102 and changes the placement position in the scene, thus placing the object at a desired position in the scene.

Figure 3A:
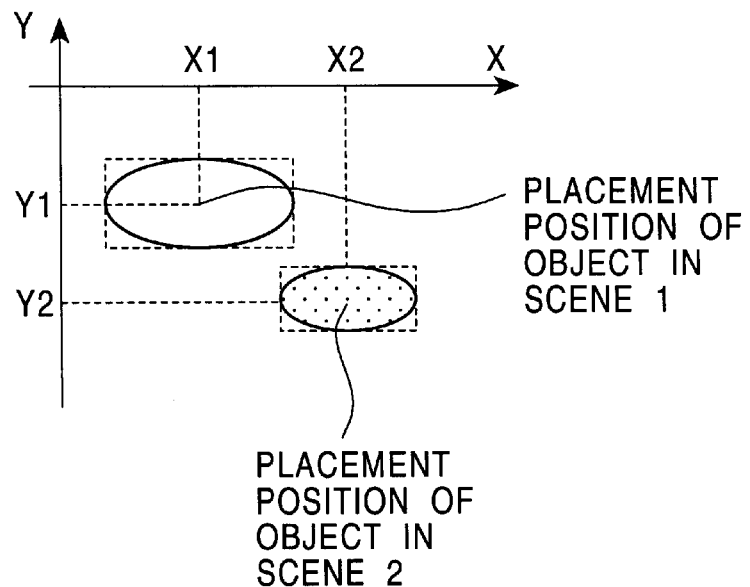
FIGS. 3A and 3B are illustrations of placement of the image object in scenes in which reference to the positional information is made.
Figure 3B:
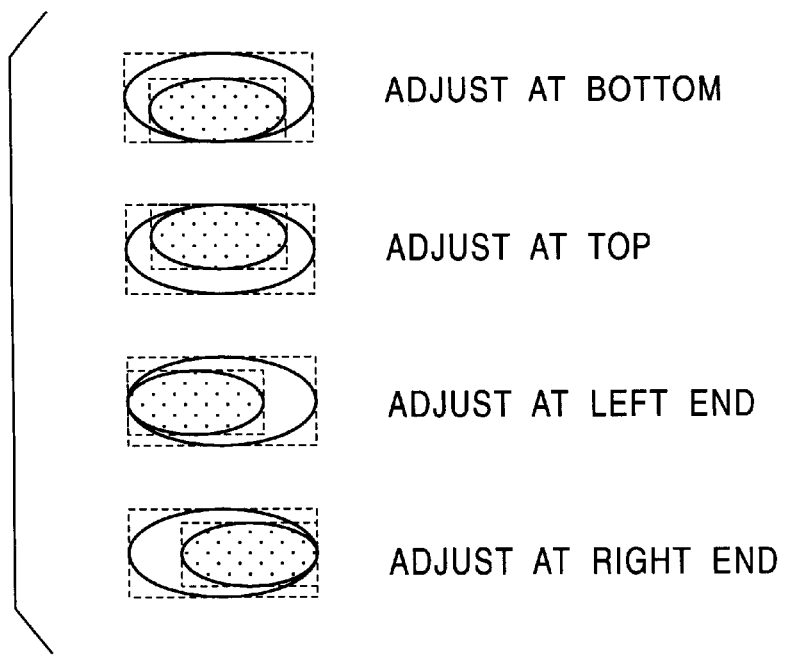

FIGS. 3A and 3B illustrate placement of the image object in the scene in which reference to the positional information is made. FIG. 3A shows placement in which movement of the object in the input image is reflected in the scene. FIG. 3B shows placement in which a shifting component is removed.

Referring to FIG. 3A, the object movement in the input image can be reflected in the scene by removing effects of the rectangular region deformation caused by the object deformation. In the related art, the shifting component of the object in the input image was unknown. Hence, it was impossible to reflect the object movement in the input image in the resultant scene. In the first embodiment, the placement position (X2, Y2) of the object in scene 2 in which the object in frame 2 is placed is changed from the placement position (X1, Y1) in scene 1 in which the object in frame 1 is placed to the following:

$$X2 = X1 + Sx \times \Delta X \tag{1a}$$

$$Y2 = Y1 + Sy \times \Delta Y \tag{1b}$$

In equations (1a) and (1b), Sx and Sy are coefficients for enlargement/reduction performed when the object is to be placed in the scene. Sx and Sy can be set to given values. The vertical coordinate axis y in MPEG-4 Video and the vertical coordinate axis Y in the MPEG-4 two-dimensional coordinate system are in opposite directions. Thus, the sign of the second term in the right-hand side of equation (1b) is opposite to that of equation (1a). In MPEG-4 Video, the upper left coordinates of the rectangular region are used to represent the position of the rectangular region. In contrast, in the MPEG-4 scene description, the center of the rectangular region is used to represent the position of the rectangular region. The values ΔX and ΔY are obtained by subtracting the effects of the rectangular region deformation caused by the object deformation from movement of the rectangular region in the input image. The values ΔX and ΔY can be expressed as follows:

$$\Delta X = \Delta h\_ref + (\Delta w/2) \tag{2a}$$

$$\Delta Y = \Delta v\_ref + (\Delta h/2) \tag{2b}$$

In contrast, as shown in FIG. 3B, the object can be placed at a specific position in the scene by removing the object movement in the input image. In the related art, when the object is to be placed in the scene, the object undesirably moves due to effects of deformation of the rectangular region containing the object resulting from the object deformation. In the present invention, the size of the rectangular region containing the object, which is included in the positional information, is used to prevent undesirable shifting. Referring to FIG. 3B, when the bottom of the object is to be aligned at the bottom of the rectangular region, ΔY in equation (1b) is set using equation (3a) below. When the top of the object is to be aligned at the top of the rectangular region, ΔY is set using equation (3b) below. When the left of the object is to be aligned at the left of the rectangular region, ΔX in equation (1a) is set using equation (3c) below. When the right of the object is to be aligned at the right of the rectangular region, ΔX is set using equation (3d) below.

$$\Delta Y = -\Delta h/2 \tag{3a}$$

$$\Delta Y = \Delta h/2 \tag{3b}$$

$$\Delta X = \Delta w/2 \tag{3c}$$

$$\Delta X = -\Delta w/2 \quad (3d)$$

All the above equations (3a) to (3d) use the positional information to reduce the effects of the rectangular region deformation caused by the object deformation on placement in the scene described by the scene description, thus preventing undesirable shifting of the object in the scene.

According to a scene description generating method of the present invention, the method refers to positional information to reflect movement in the input image or to remove the shifting component and to display the object in the scene. Alternatively, the method employs the positional information to adjust Sx and Sy in equations (1a) and (1b) based on the size of the rectangular region.

In the ISO14496-1 standard MEPG-4 scene description, an update function changes contents of the scene description over time, and an animation function changes a given field value of a given node in the scene description. The placement position of the object in the scene can be changed by the update function and the animation function changing only the placement position, not the entire scene. This can be performed by a method for inserting a programmable action, referred to as "Script", in the scene description, or by a method for directly rewriting contents of the scene description from the outside.

Although FIGS. 2A, 2B, 3A, and 3B show the example in which the two-dimensional scene is displayed based on the two-dimensional scene description, the present invention is c applicable to cases in which a three-dimensional scene is described, and the three-dimensional scene is projected onto a two-dimensional plane of a two-dimensional display device. When an object is to be placed in a three-dimensional coordinate system, the placement position of the object is translated on a plane containing the object using equations (1a) and (1b), and the placement position at which the object is finally placed is determined so as to be equivalent to being placed in a three-dimensional coordinate system.

Referring to FIGS. 4A to 12, an editing system according to a second embodiment of the present invention is described. In the first embodiment, the image object is directly placed in the scene. In the second embodiment, a segmented image is employed as a texture in a scene. The system configuration is the same as that shown in FIG. 1.

In this system, the scene description generator 106 in the scene description processor 105 generates the ISO14496-1 standard MPEG-4 scene description 107 based on a designation of what the constructed scene will be. The scene description generator 106 refers to the positional information 108 output from the segmentation unit 102, and sets texture coordinates of a segmented image, which will be employed as a texture to be pasted on a surface of a scene object in a scene. Reference to the positional information 108 prevents the texture to be pasted in the scene described by a scene description from being distorted due to the object deformation. In the related art, the object movement in the input image is not reflected in the texture. However, the present invention is capable of reflecting the object movement in the input image by referring to the positional information 108.

Figure 4A:
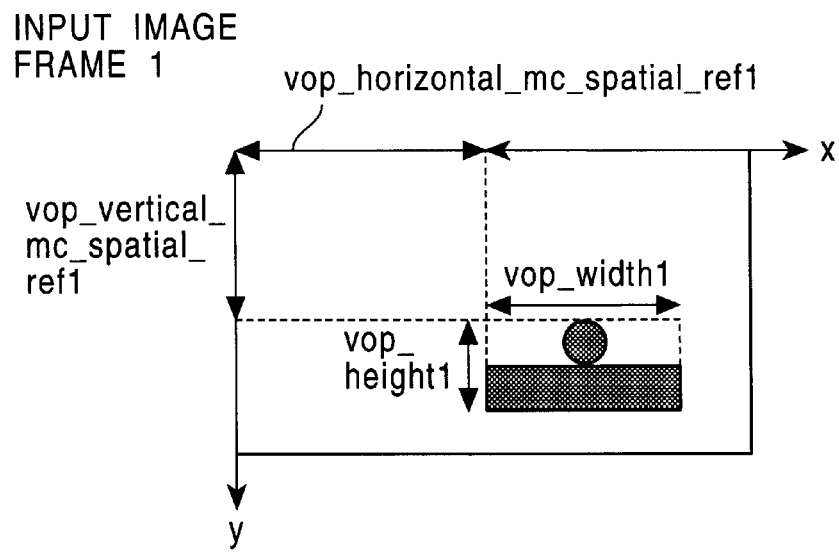
FIGS. 4A and 4B are conceptual illustrations of segmentation of an input image and positional information in an editing system according to a second embodiment of the present invention.
Figure 4B:
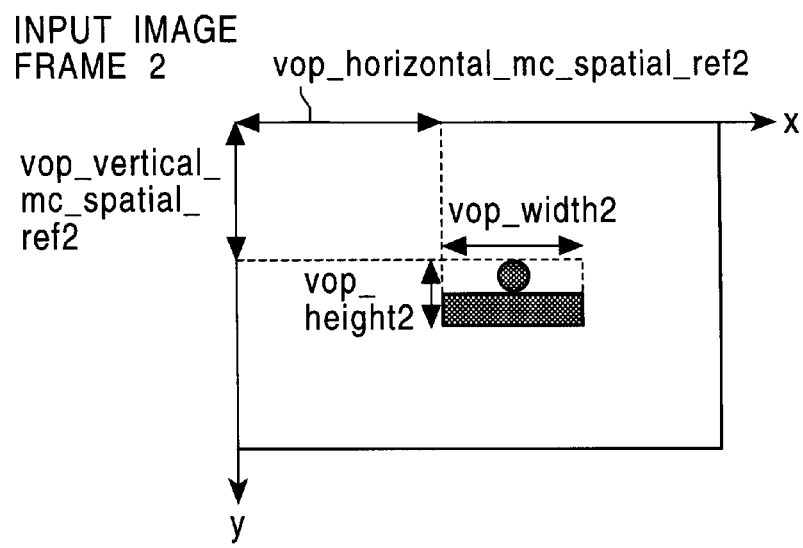

FIGS. 4A and 4B show concepts of segmentation of the input image and the positional information. FIGS. 5 to 8 show setting of a texture map and texture coordinates when the segmented image is employed as the texture.

Referring to FIGS. 4A and 4B, similar to FIGS. 2A and 2B, the positional information includes the horizontal size vop_width and the vertical size vop_height of the rectangular region containing the object, and the upper left x-coordinate vop_horizontal_mc_spatial_ref and the y-coordinate vop_vertical-mc_spatial_ref of the rectangular region in the input image. Between adjacent frames 1 and 2 of the input image, the object moves in the input image and is deformed, thus changing the size of the rectangular region containing the object. A variation in the horizontal size of the rectangular region is expressed by $\Delta w$, and a variation in the vertical size is expressed by $\Delta h$. These values represent variations caused by the object deformation. Based on the positional information, these values are obtained by the following:

$$\Delta w = vop\_width2 - vop\_width1$$

$$\Delta w = vop\_height2 - vop\_height1$$

Horizontal movement of the rectangular region containing the object is expressed by $\Delta h\_ref$, and vertical movement is expressed by $\Delta v\_ref$. These values are variations caused by both the object deformation and the object movement. Based on the positional information, these values are obtained by the following:

$$\Delta h\_ref = vop\_horizontal\_mc\_spatial\_ref2 - vop\_horizontal\_mc\_spatial\_ref1$$

$$\Delta v\_ref = vop\_vertical\_mc\_spatial\_ref2 - vop\_vertical\_mc\_spatial\_ref1$$

Figure 5:
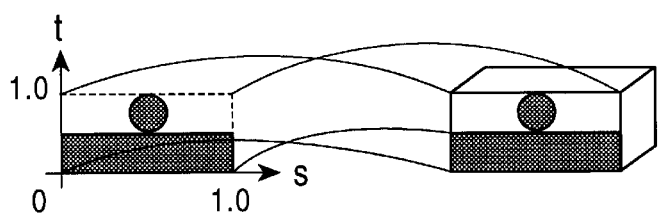
FIG. 5 is an illustration of pasting a texture map in frame 1 on a surface of an object in scene 1.
Figure 6:
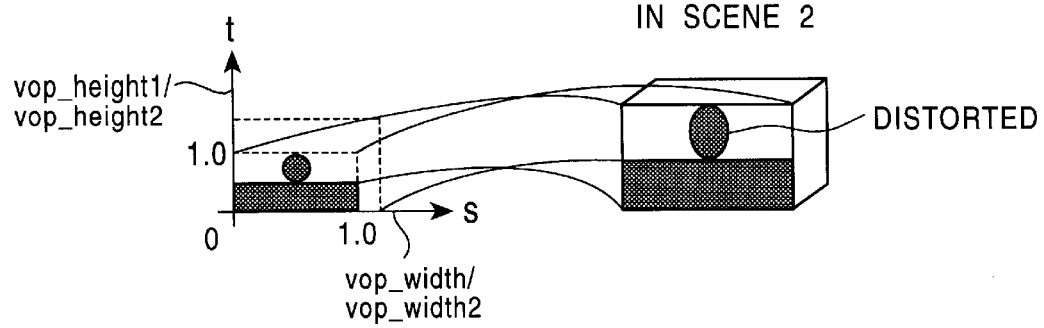
FIG. 6 is an illustration of texture distortion caused by an object deformed between frame 1 and frame 2.

In the related art, the segmented image is regarded to be within the range from 0 to 1 in the s–t coordinate system, i.e., the two-dimensional texture coordinate system. This is referred to as the texture map. FIG. 5 shows pasting of the texture map in frame 1 on a surface of the scene object. Even when the object is deformed in the input image, the rectangular region containing the object is still regarded to be in the range from 0 to 1 in the s–t coordinate system, that is, the texture coordinate system, and the texture pasted in the scene is distorted. Referring to FIG. 6, even when the object is deformed between frame 1 and frame 2, the rectangular region containing the object is still regarded to be in the range from 0 to 1 in the s–t coordinate system, and the textured scene object in scene 2 is distorted.

In order to prevent this distortion, the scene description generator 106 in the system of the second embodiment refers to the positional information 108 output from the segmentation unit 102 and transforms the texture coordinates to be applied to the texture map. Hence, an undistorted texture can be pasted. The scene description generator 106 does not transform the texture map itself, but transforms the texture coordinates. This is because the "TextureTransform" node in the MPEG-4 scene description is capable of enlarging/reducing the texture coordinates and of translating the texture coordinates. When other types of scene descriptions are used, the texture map instead of the texture coordinates can be transformed.

Figure 7:
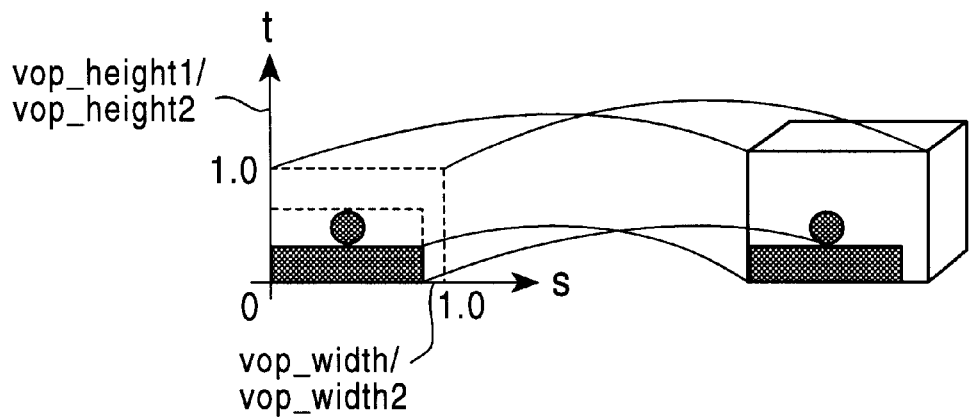
FIG. 7 is an illustration of an example in which texture coordinate axes are enlarged/reduced in size, and are subsequently applied to a texture map in the second embodiment.

When the object is deformed in the input image, and the rectangular region containing the object is also deformed, an undistorted texture can be pasted in the scene as follows. Referring to FIG. 7, the horizontal s-axis of the texture coordinate system is multiplied by vop_width1/vop_width2, and the vertical t-axis is multiplied by vop_height1/vop_height2. These values are reciprocals of variations of the object size because it is the texture coordinates that are transformed. This multiplication is equivalent to relatively enlarging/reducing the texture map by the same ratio as the variations of the object size. Accordingly, the object deformation in the input image can be reflected in the texture map. This prevents distortion of the texture being pasted on the surface of the scene object in the scene. In FIG. 7, the lower left of the texture image is aligned at the lower left of the texture image of the previous frame. This can be done by setting values of a field referred to as a "center" to (t, s)=(0, 0). The "center" is designated when enlarging/reducing the coordinate axes of a node referred to as "TextureTransform" in the MPEG-4 scene description. Alternatively, the texture image can be aligned at different positions. For example, when the values of the "center" are set to (0, 1.0), the enlargement/reduction of the axes are performed so that the image is aligned at the upper left. When the values of the "center" are set to (0.5, 0.5), the axes are enlarged/reduced so that the image is aligned at the center of the texture image in the previous frame.

Figure 8:
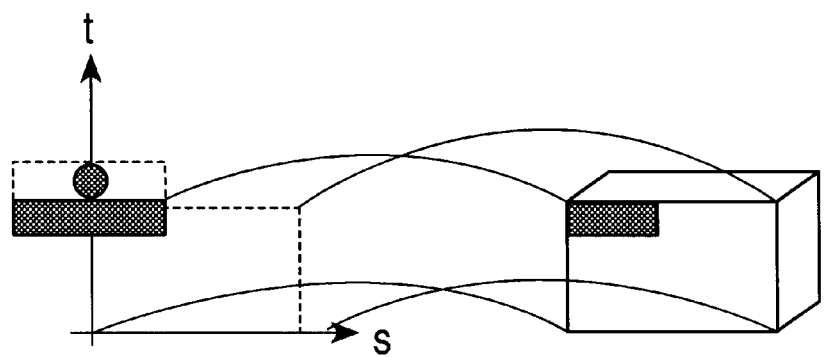
FIG. 8 is an illustration of an example in which the texture coordinate axes are translated, and are subsequently applied to the texture map.

In contrast, there are cases in which it is desired that the object movement in the input image be reflected in the texture to be pasted in the scene. In the second embodiment, the reference to the positional information 108 enables the object movement to be reflected in the texture to be pasted in the scene. Referring to FIG. 8, the texture coordinates are translated with respect to the texture map by $\Delta s$ in the horizontal s-axis direction and by $\Delta t$ in the vertical t-axis direction:

$$\Delta s = -\Delta h\_ref/vop\_width2 \quad (4a)$$

$$\Delta t = (\Delta v\_ref + \Delta h)/vop\_height2 \quad (4b)$$

These values $\Delta h\_ref$ and $\Delta v\_ref$ represent horizontal and vertical variations of the upper left coordinates of the region containing the object. The value $\Delta h$ indicates a variation in the vertical size of the region. Equations (4a) and (4b) have different values of the terms in the right-hand side denominators. This is because the origin of the texture coordinate system is initially placed at the lower left of the texture map, whereas the region containing the object is placed according to the reference point at the upper left position. When the above processing is performed in combination with prevention of distortion caused by enlarging/reducing the texture coordinates, the s-axis and the t-axis are further enlarged/reduced. In the texture coordinate transformation in the MPEG-4 scene description, translation is performed prior to enlargement/reduction. Denominators of the right-hand sides of equations (4a) and (4b) use the size of the rectangular region in frame 2 to normalize the horizontal axis and the vertical axis to be in the range from 0 to 1. With equations (4a) and (4b), in FIG. 8, translation is performed prior to setting the values of the "center" to (0, 0). The horizontal s-axis of the texture coordinate system is multiplied by vop_width1/vop_width2, and the vertical t-axis is multiplied by vop_height1/vop_height2.

As described above, in the second embodiment, the texture coordinates are transformed based on the reference to the positional information, thus preventing the texture distortion, which was not solved in the related art. Also, the object movement in the input image can be reflected in the texture to be pasted in the scene, which was not possible in the related art.

Figure 9:
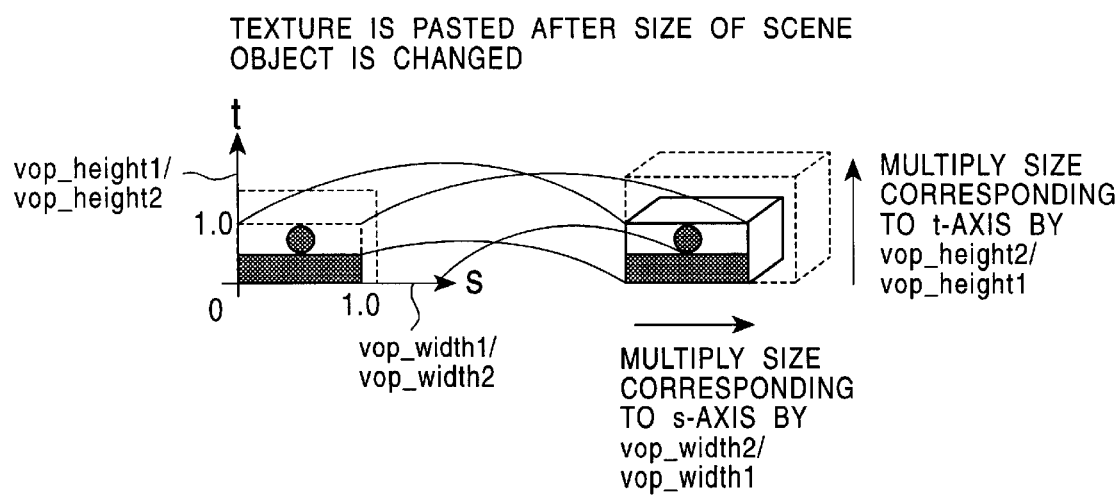
FIG. 9 is an illustration of an example of changing the size of a target scene object and pasting the texture on the scene object.

In order to prevent the texture distortion resulting from the object deformation, the texture coordinates can be transformed, as described above. Alternatively, this problem can be solved by changing the size of the scene object on which the texture is to be pasted. Referring to FIG. 9, texture distortion is prevented by changing the size of the scene object instead. As in the case in which the texture coordinates are transformed, when the size of the object is changed, the texture map is regarded to be in the range from 0 to 1 in the texture coordinate system. Hence, the size of the scene object on which the texture is to be pasted is enlarged/reduced by the same ratio as the change in the size of the object in the input image. Accordingly, the texture distortion is prevented. The size of the scene object is set by multiplying the sizes corresponding to the s-axis and the t-axis of the texture to be pasted by variations in the horizontal and vertical sizes of the object in the input image.

In order to prevent the texture distortion resulting from the object deformation, apart from transforming the texture coordinates and changing the size of the scene object on which the texture is to be pasted, there is a method for changing the position of the texture to be pasted on the scene object.

Figure 10:
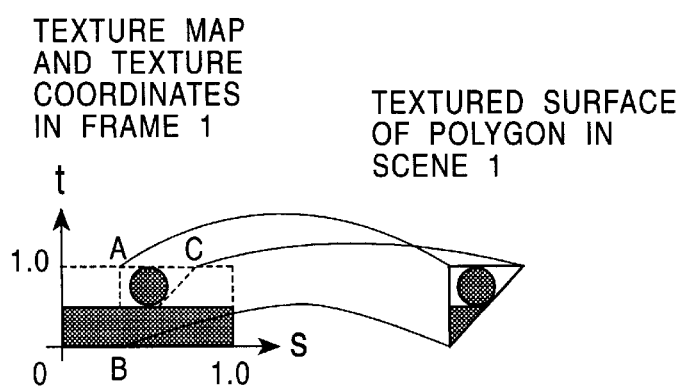
FIG. 10 is an illustration of a method for changing the position at which the texture is pasted on the scene object.
Figure 11:
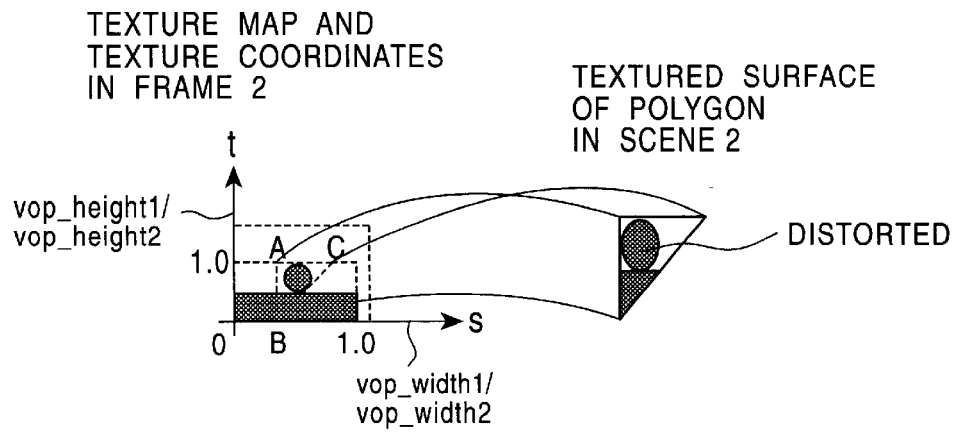
FIG. 11 is an illustration of distortion of a textured scene object in a scene when the object is deformed.
Figure 12:
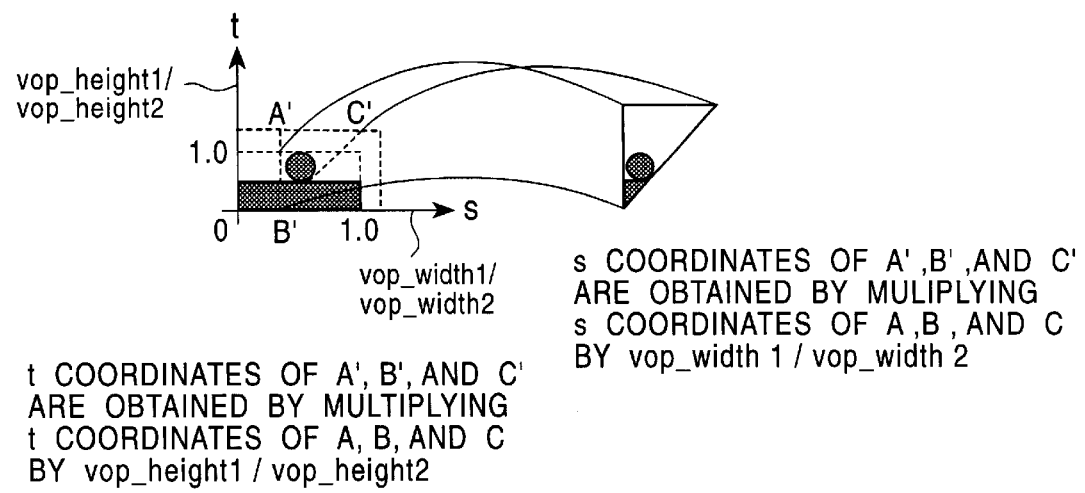
FIG. 12 is an illustration of an example of an undistorted texture.

Referring to FIGS. 10 to 12, the texture is to be pasted in the scene on a scene object having three vertices. Hereinafter, this scene object is referred to as a polygon. In order to paste the texture on the polygon, the position of the texture map at which the texture is used is designated for each vertex. Referring to FIG. 10, three points A, B, and C of the texture map are designated, and the position of the texture to be used is designated.

Even when the object is deformed, as in FIG. 4B, the texture map is still regarded to be in the range from 0 to 1 in the texture coordinate system. If the positions of the points A, B, and C remain unchanged, the texture to be pasted is distorted, as in FIG. 11. In order to prevent this distortion, as shown in FIG. 12, the positions of the points A, B, and C in the texture coordinate system are shifted to A'B'and C' by the same ratio as the change in the size of the object in the input image. Hence, the texture distortion is prevented. The s-axis coordinates and the t-axis coordinates of the points A'B'and C' are set by multiplying the s-axis coordinates and the t-axis coordinates of the points A, B, and C by the variations of the size of the object in the input image. The object movement in the input image can be reflected in the texture to be pasted in the scene by translating the positions of the points A'B'and C' in the texture coordinate system. This is as advantageous as translation in the above texture coordinate transformation.

As described above, the texture distortion resulting from the object deformation is prevented by transforming the texture coordinates, by changing the size of the scene object on which the texture is to be pasted, or by changing the position of the texture to be pasted on the scene object. This is made possible by employing the positional information on the object in the input image.

Figure 13:
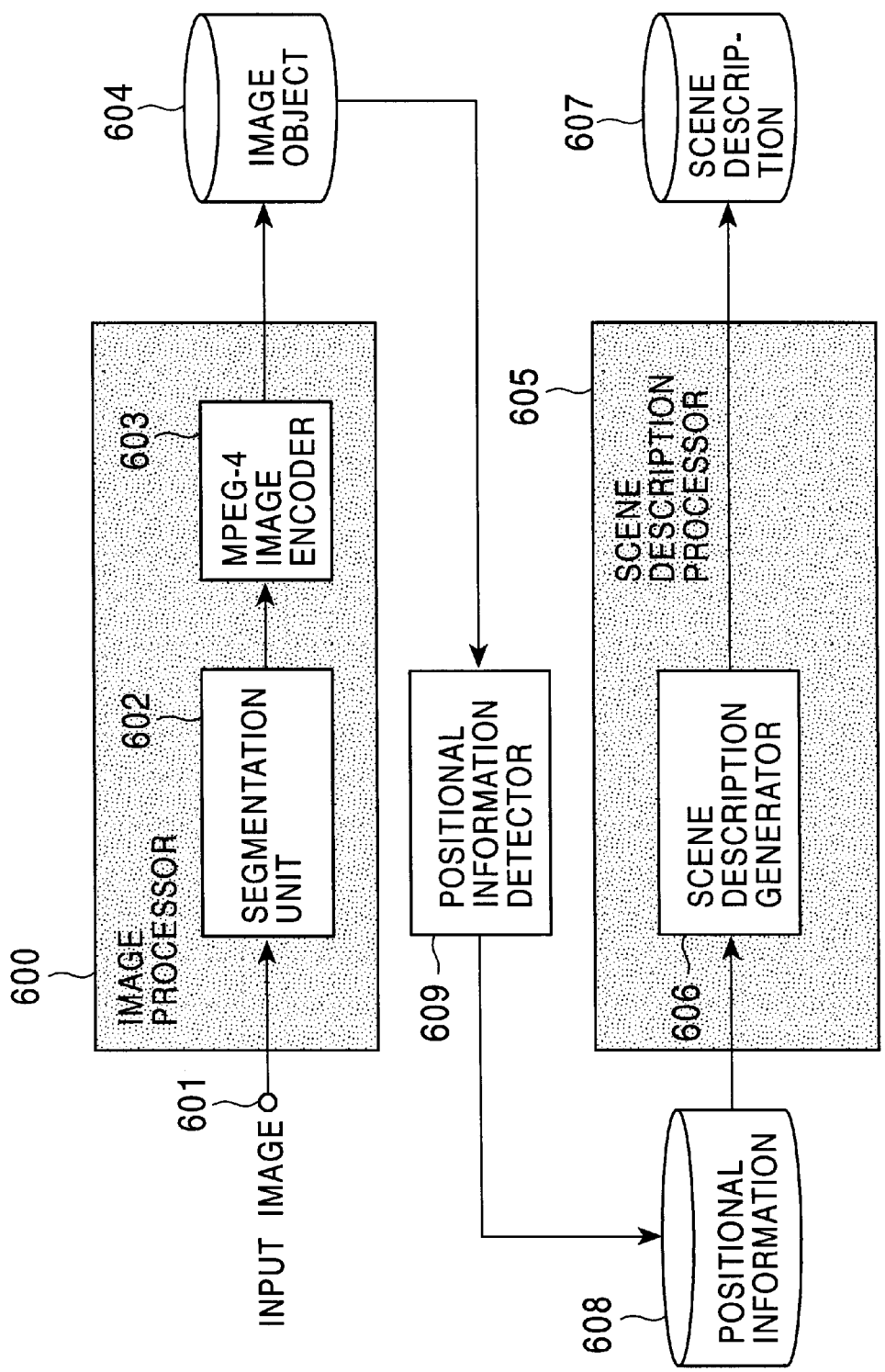
FIG. 13 is a block diagram of an editing system according to a third embodiment of the present invention.

Referring to FIGS. 13 to 16, an editing system according to a third embodiment of the present invention is described. As shown in FIG. 13, this editing system includes an image processor 600 for processing an input image 601, a positional information detector 609 for detecting positional information 608 from an image object 604 output from the image processor 600, and a scene description processor 605 for outputting a scene description 607 based on the positional information 608 detected by the positional information detector 609.

The input image 601 is input to the image processor 600. A segmentation unit 602 segments the image object, and an MPEG-4 image encoder 603 encodes the image object and outputs the image object 604.

The image object data 604 is input to the positional information detector 609, and the positional information detector 609 extracts the positional information 608 of the object in the input image.

The positional information 608 detected from the image object 604 by the positional information detector 609 is input to the scene description processor 605, and a scene description generator 606 generates the scene description 607. The scene description generator 606 refers to the positional information 608 of the object and determines the placement position of the object in the scene.

Specifically, the second embodiment differs from the first embodiment in that, instead of outputting the positional information 608 from the segmentation unit 602 in the image processor 600, the image object data 604 is input to the positional information detector 609 and the positional information detector 609 detects the positional information 608. This is similarly effective when using an image object which is segmented by another segmentation unit, apart from the segmentation unit 102, employed in the first and second embodiments, capable of outputting the positional information, and which is encoded.

Figure 14:
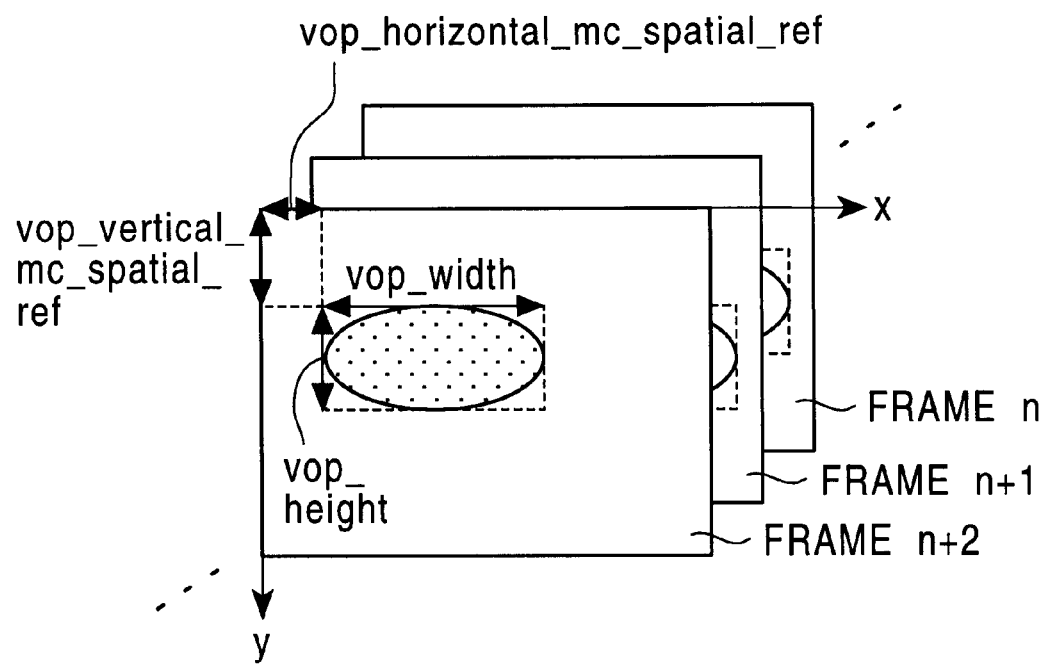
FIG. 14 is an illustration of rectangular regions including an object in a series of input images.
Figure 15:
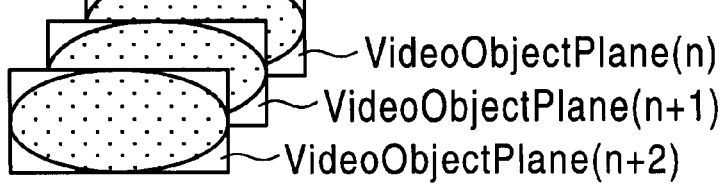
FIG. 15 is an illustration of an image object.
Figure 16:
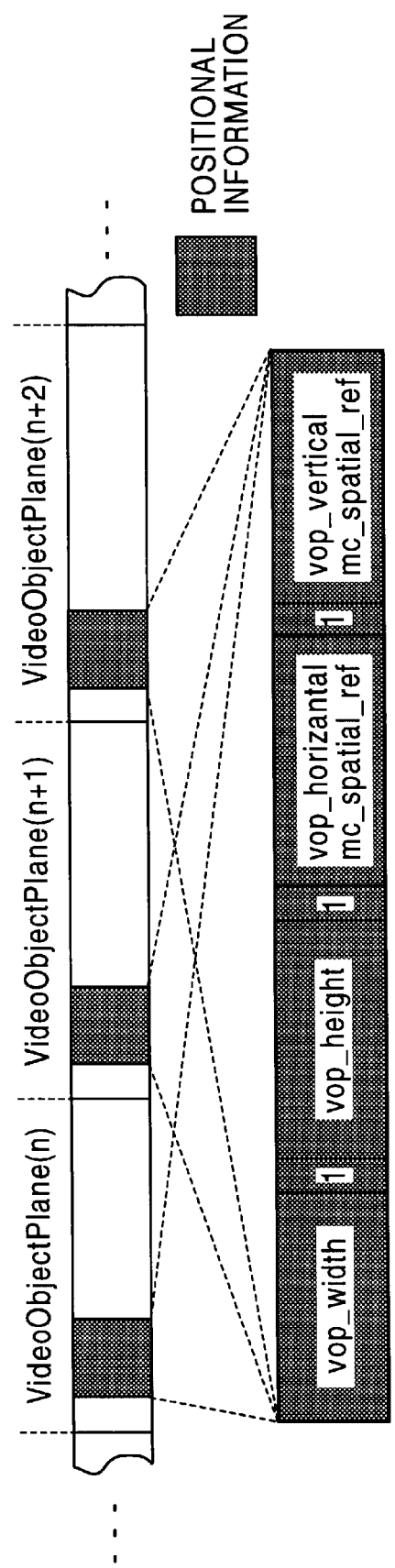
FIG. 16 is a diagram of the format of encoded data of the image object.

Referring to FIGS. 14 to 16, the structure of encoded data of the image object obtained by MPEG-4 video encoding system using the MPEG-4 image encoder 603 is described. FIG. 14 shows a rectangular region containing the object in a series of input images. FIG. 15 shows the image object. FIG. 16 shows the format of the encoded data of the image object.

Data corresponding to the image object shown in FIG. 15 arranged in frames of the series of input images shown in FIG. 14 is referred to as "VideoObjectPlane". The positional information including the size and the coordinates of the rectangular region containing the object, as described in the first and second embodiments, is encoded in the image object data for each VideoObjectPlane, as shown in FIG. 16. Therefore, the encoded data of the image object is input to the positional information detector 609, and the positional information detector 609 detects the positional information 608. The operation of the scene description generator 606 is the same as that in the first and second embodiments.

The image object encoding system is not limited to the MPEG-4 video encoding system. The present invention is applicable to any encoding system for encoding the positional information. The positional information detector 609 can be used in combination with the segmentation unit 102 described in the first and second embodiments. For example, the segmentation unit 102 detects the position of the object in the input image, whereas the positional information detector 609 of the third embodiment extracts the size of the rectangular region.

Figure 17:
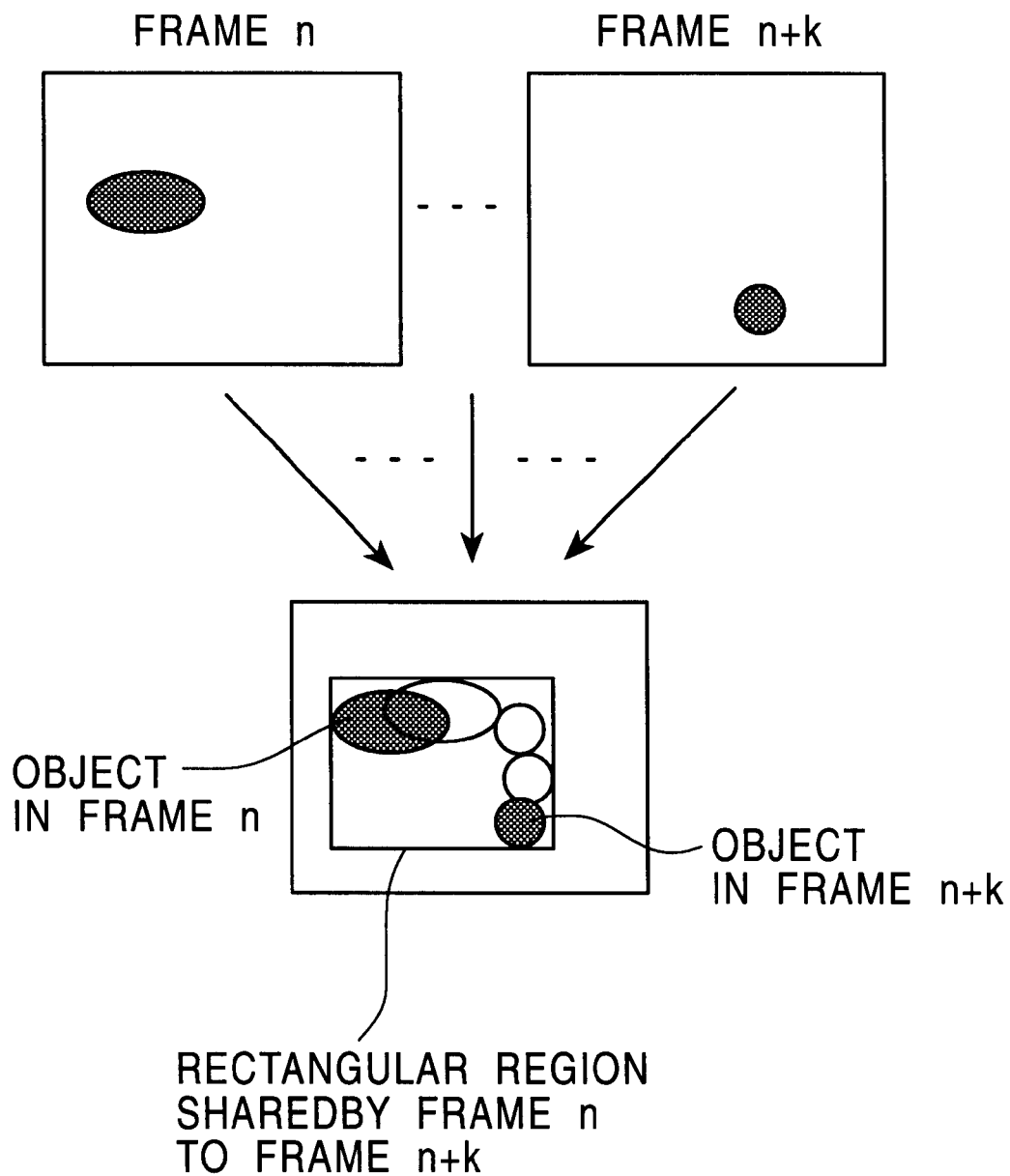
FIG. 17 is an illustration of a concept of an editing system according to a fourth embodiment of the present invention.

Referring now to FIG. 17, an editing system according to a fourth embodiment of the present invention is described. In this editing system, the structure of the system for performing segmentation and for generating a scene description is the same as that illustrated in FIG. 1 and FIG. 13.

In the fourth embodiment, the following processing is avoided when an input image is segmented to generate an object and a scene description of the segmented object to be used in a scene is generated. Specifically, whenever the object in the input image is deformed, changing a placement position in the scene, texture coordinates, the size of a scene object on which a texture is to be pasted, or the position of the texture to be pasted is avoided. To this end, the segmentation unit 102 or 602 sets a region containing the object as a region containing the object in a plurality of frames.

Referring to FIG. 17, a common rectangular region to be used by plural frames is set. For a given object, all frames including frame n to frame n+k are employed to determine a region containing the object. The determined region is shared by all frames including frame n to frame n+k. When encoding the segmented image, the determined region is used. Since the region containing the object is not deformed or shifted, the object in the scene from frame n to frame n+k is not undesirably shifted, which did not occur in the original input image, even though the placement position of the object in the scene remains unchanged. When the segmented image is used as a texture, the texture is not distorted since the region containing the object is not deformed or shifted. Hence, the problem in the related art is prevented. Since it is not necessary to change the placement position of the object in the scene from frame n to frame n+k, it is also not necessary to change the positional information 108 or 608 from frame n to frame n+k, as in the first to third embodiments. Hence, the positional information 108 or 608 is not required to be changed from frame n to frame n+k. From frame n to frame n+k, it is not necessary to transform the placement position of the object in the scene description, the texture coordinates, the size of the scene object on which the texture is to be pasted, or the position of the texture to be pasted.

In the fourth embodiment, when determining the rectangular region, the rectangular region shared by the whole series of input images is set. Accordingly, it is not necessary to transform the placement position of the object in the scene, the texture coordinates, the size of the scene object on which the texture is to be pasted, or the position of the texture to be pasted. Thus, it is not necessary to update the positional information in the first to third embodiments.

Figure 18:
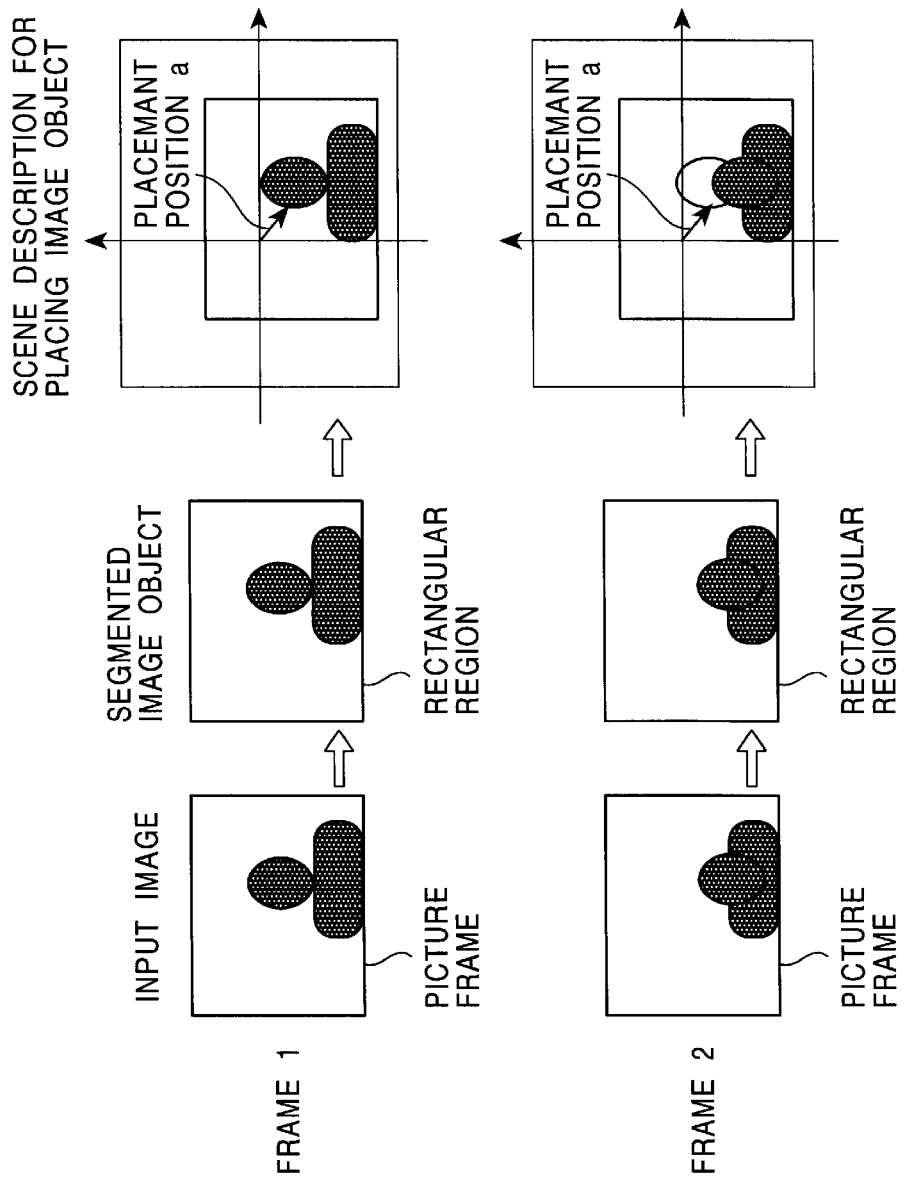
FIG. 18 is an illustration of a concept of an editing system according to a fifth embodiment of the present invention.
Figure 19:
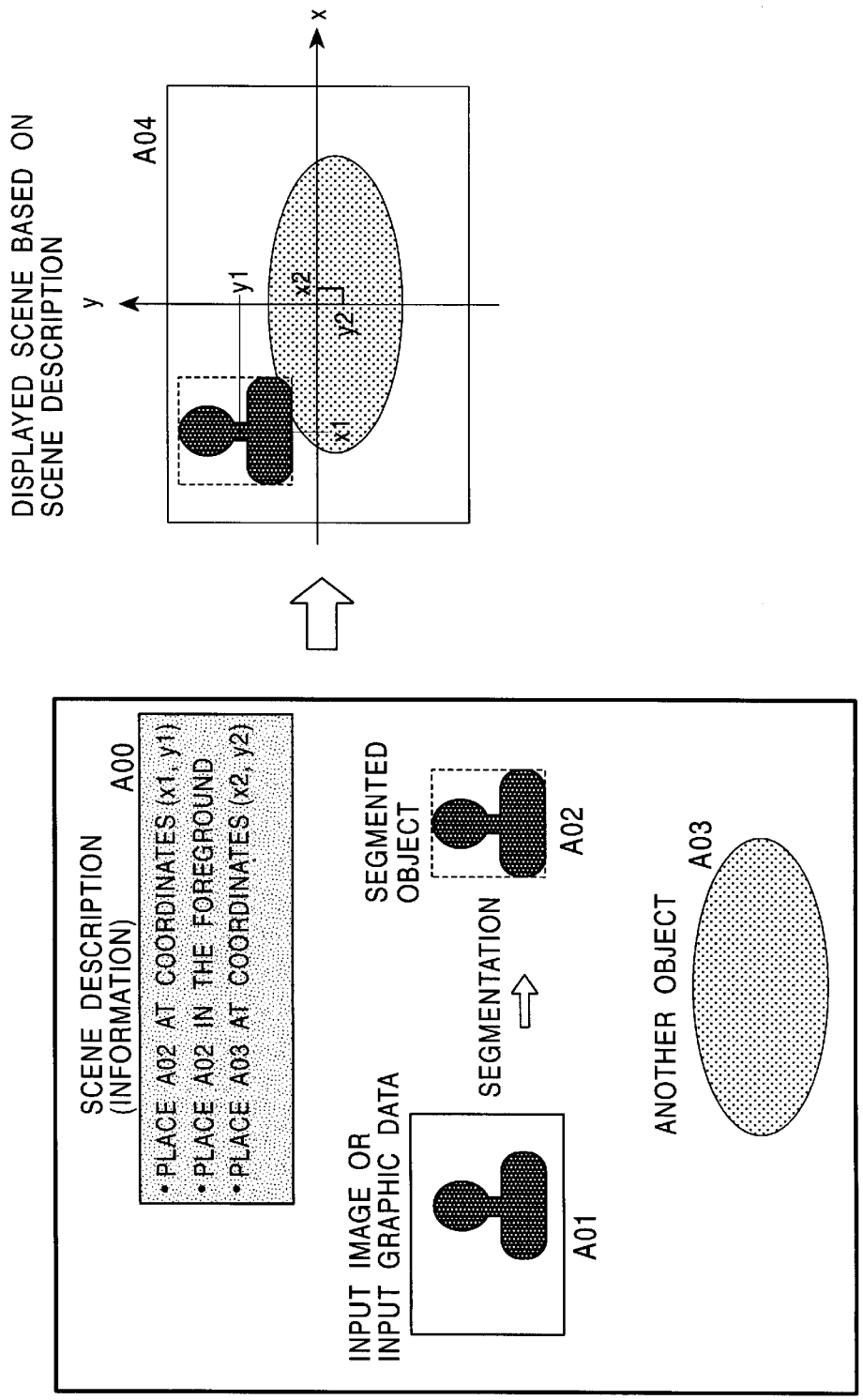
FIG. 19 is an illustration of scene description technology for placing static image signals, moving image signals, and graphic data in a screen and for describing a new scene.
Figure 20:
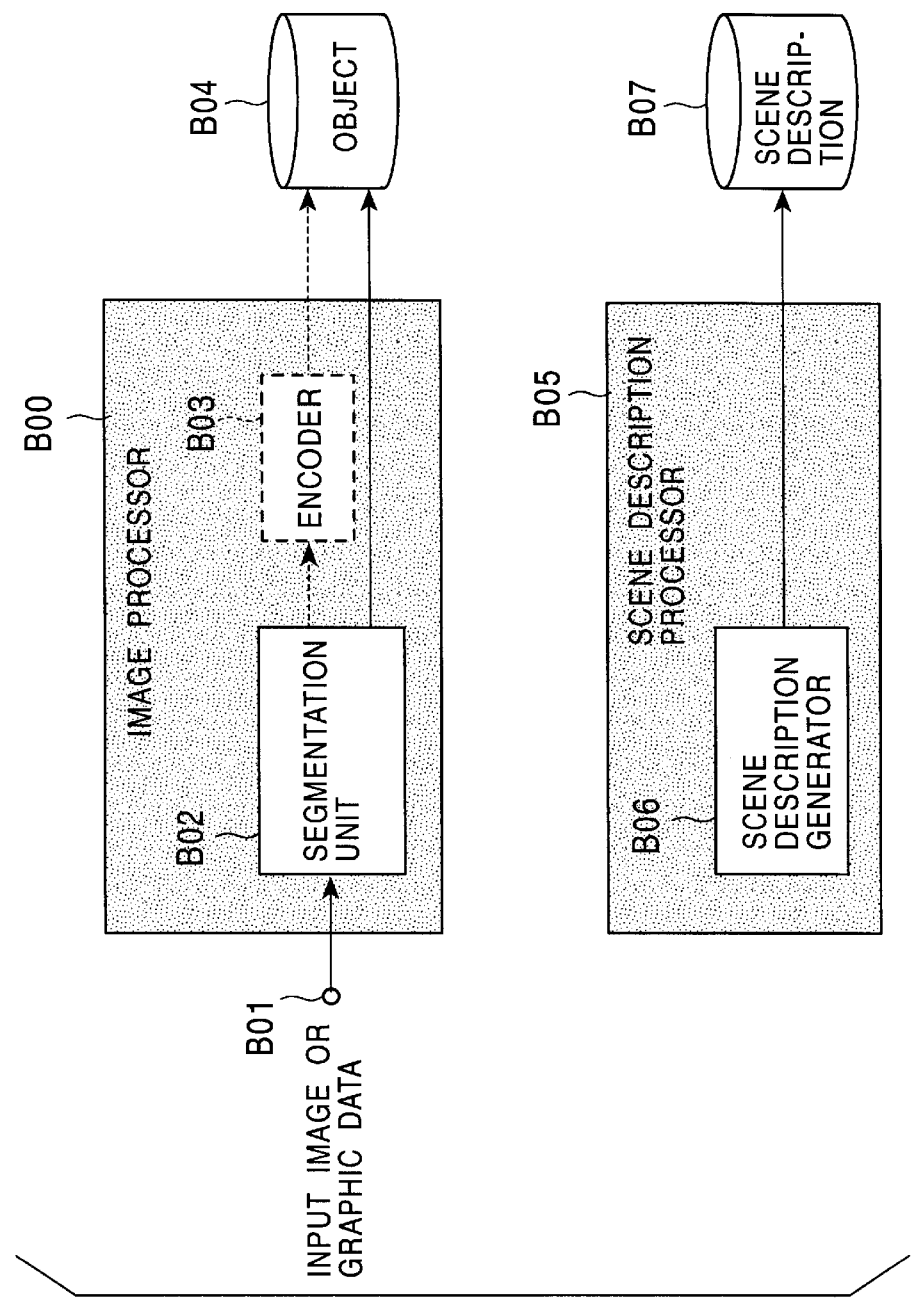
FIG. 20 is a block diagram of a conventional editing system for performing segmentation and generating a scene description.
Figure 21:
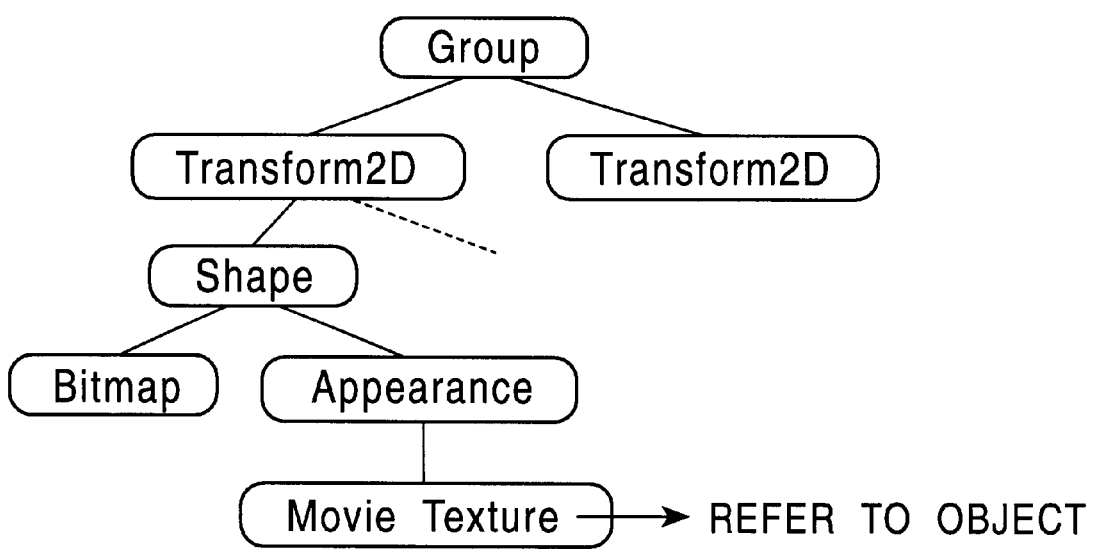
FIG. 21 is an illustration of the structure of a scene description.
Figure 23:
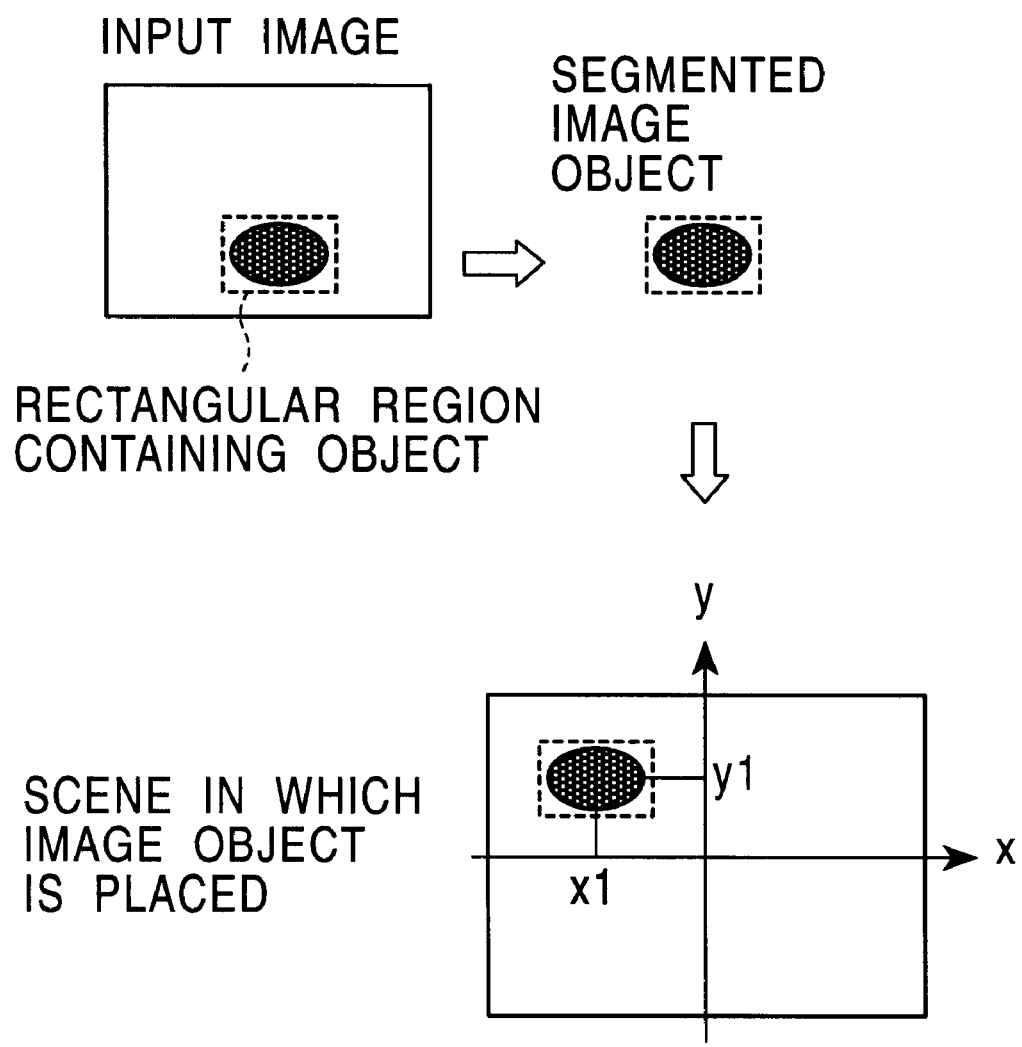
FIG. 23 is an illustration of an example of a scene.
Figure 24:
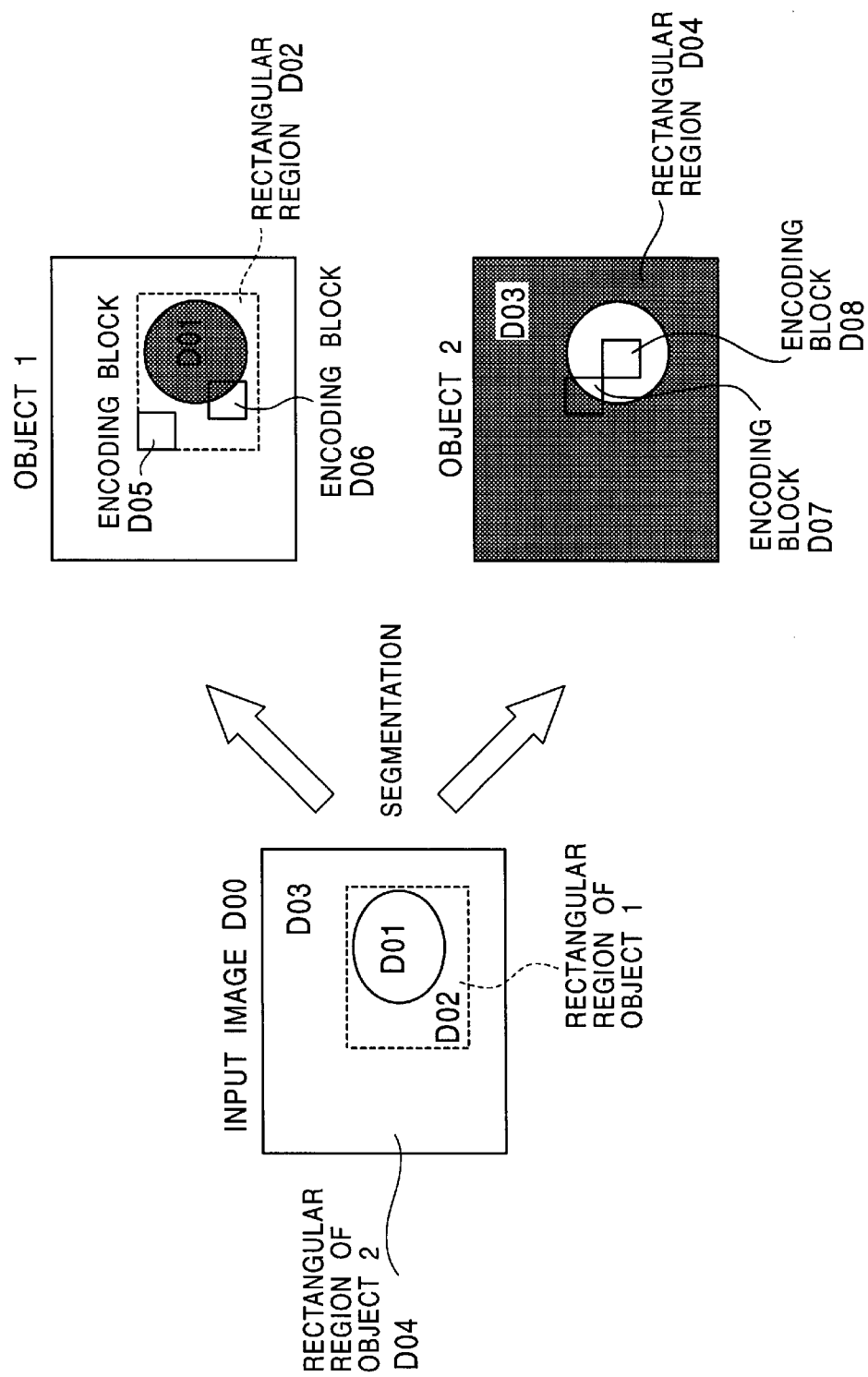
FIG. 24 is an illustration of an example in which an elliptical object D01 and a background object D03 are segmented in an input image D00, and are encoded.
Figure 25:
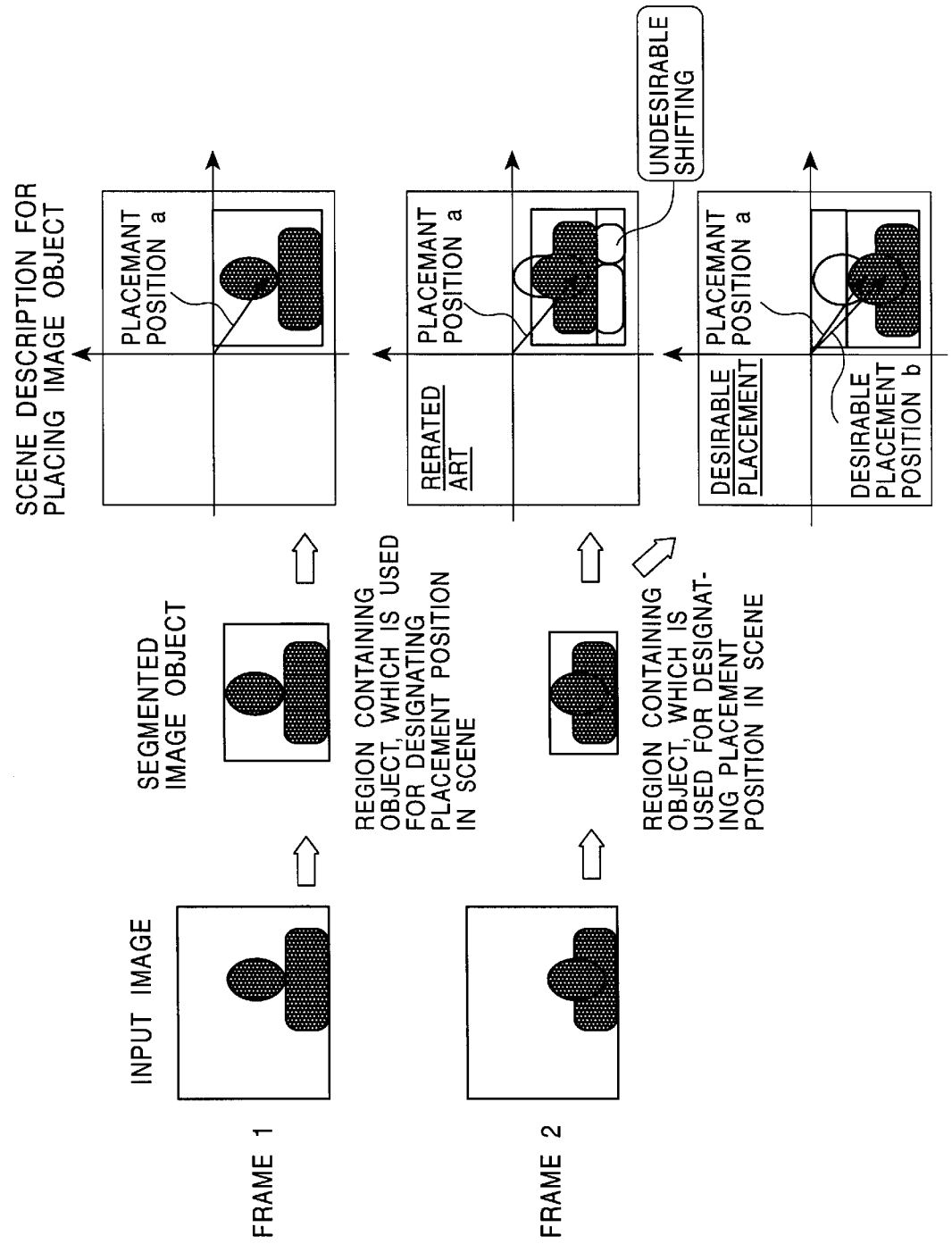
FIG. 25 is an illustration of a problem occurring when an MPEG-4 Video image object is placed in a scene.
Figure 26:
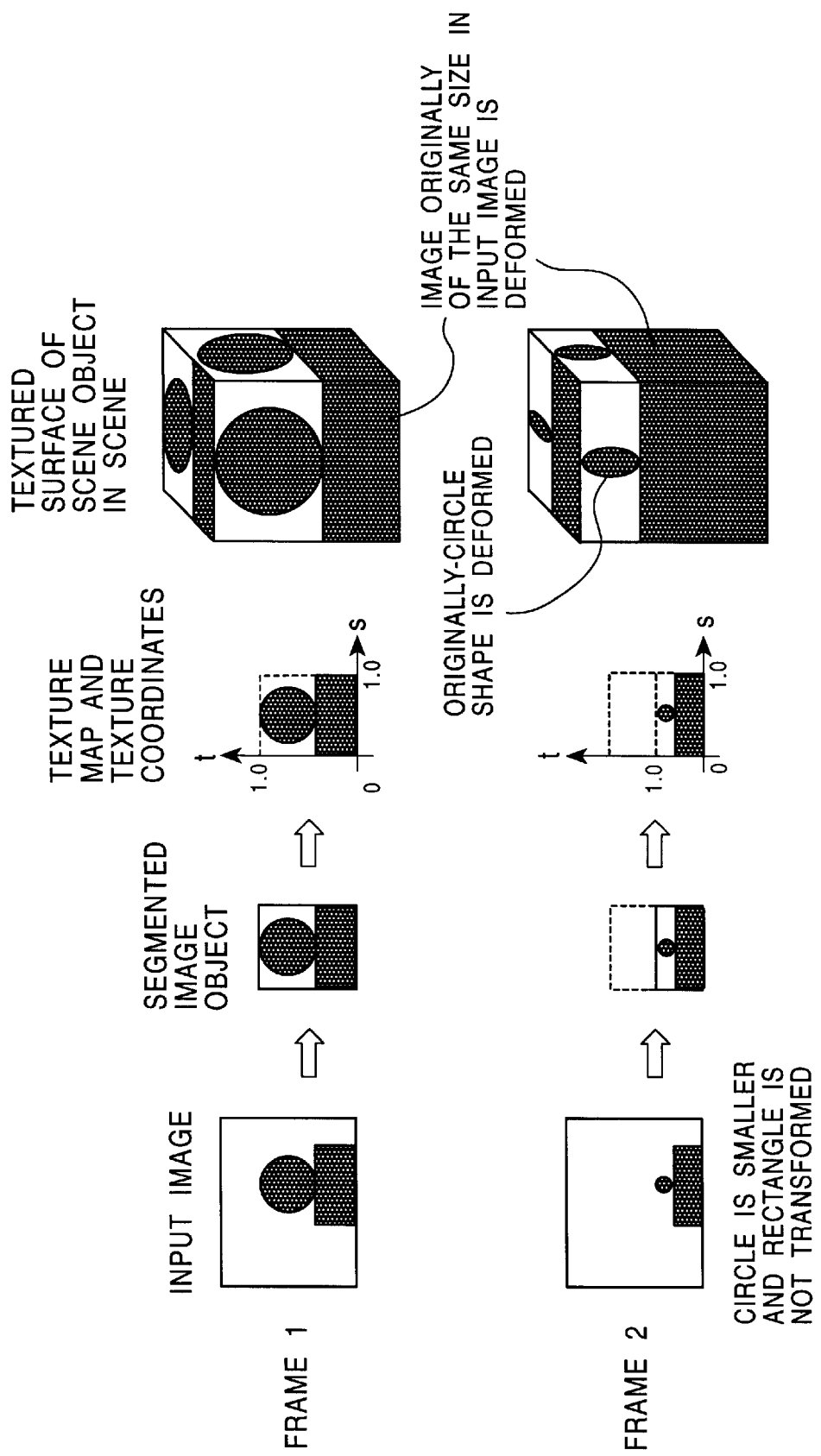
FIG. 26 is an illustration of an example of pasting an image object on a surface of a cube.

Referring to FIG. 18, an editing system according to a fifth embodiment is described. In this system, the structure of the system for performing segmentation and for generating a scene description is the same as that in FIG. 1 or FIG. 13.

In the fifth embodiment, the following processing is avoided when an input image is segmented to generate an object and a scene description of the segmented object to be used in a scene is generated. Specifically, whenever the object in the input image is deformed, changing a placement position in the scene, texture coordinates, the size of a scene object on which a texture is to be pasted, or the position of the texture to be pasted is avoided. To this end, the segmentation unit 102 or 602 sets a region containing the object as a region containing the object in a plurality of frames.

Referring to FIG. 18, a region containing the object is set to cover an entire picture frame of the input image. Since an object is part of the input image, it is self-evident that the object is always contained within the picture frame of the input image. It is also self-explanatory that the positional information on the region remains unchanged when the region is set as the entire frame of the input image. This completely dispenses with updating of the positional information. Since the region containing the object remains unchanged, the object placed in the scene is not undesirably shifted, which did not occur in the original input image, even though the placement position of the object in the scene is not changed. When the segmented image is used as a texture, the texture is not distorted since the region containing the object is not deformed or shifted. Hence, the problem in the related art is thereby prevented. Since it is not necessary to change the placement position of the object in the scene, it is also not necessary to change the positional information, to which reference is made in the first to third embodiments. It is self-evident that both the upper left x-coordinate vop__horizontal__mc__spatial__ref and the y-coordinate vop__vertical__mc__spatial__ref of the rectangular region are zero, and that both the size vop width and the size vop__height of the rectangular region are equal to the width and the height of the picture frame of the input image. When these points are given in advance, the positional information is unnecessary. The structure of the system for performing segmentation and for generating a scene description is the same as that in the related art.

In the MPEG-4 video encoding system for encoding the segmented object, as described above, when the encoding block in the rectangular region containing the object does not include object data, only a flag representing "there is no encoded data" is encoded. An increase in quantity of encoded bits caused by setting the region containing the object as the entire picture frame is small.

In the present invention, the object encoding system is not limited to the MPEG-4 video encoding system. The present invention is similarly effective when another encoding system is used. The object is not necessarily encoded. The input is not limited to an image. The input can be graphic data, such as computer graphics (CG). The present invention is similarly effective when the scene description is input to the segmentation unit and part of the scene description is segmented to generate another object, or when that object is placed in another scene description. When a three-dimensional scene description is input to the segmentation unit and part of the three-dimensional scene description is segmented to generate another object, or when that object is placed in another scene description, the present invention is similarly effective by extending the positional information to three-dimensional positional information. The scene description is not limited to the MPEG-4 scene description. In another type of scene description, the same advantages as those in the present invention can be achieved by correcting the placement position, the texture coordinates, the size of the scene object, or the texture position based on the positional information. The positional information is effective as long as it includes information similar to the size and the position of the region. For example, the position of the region may be designated at the center or the upper left. Alternatively, the position of the region may be designated at a given position as long as similar information is included. According to the type of scene descriptions, the region may not necessarily be rectangular. The centroid of the object may be used as the positional information. Therefore, the object placement position described in the first embodiment and the texture coordinate transformation equations described in the second embodiment may vary according to expressions of the positional information and to the type of scene descriptions. These equations can be replaced by equations realizing the same effects.

The positional information is output only when a variation occurs. In the MPEG-4 video encoding system, frames are allowed to be at irregular time intervals. The positional information is effective as long as it includes information indicating the time at which a frame is displayed. If the input image is not a moving image, but is a static image or graphic data which does not change over time, it is advantageous to refer to the positional information on the present invention when determining the placement position in the scene description. Even when the positional information includes only one of the position and the size of the input image or the graphic data, the scene description generator refers to the available positional information to perform restricted correction of the placement position. For example, when the position of the input image or the graphic data is not available, and only the size of the region containing the object is available, the placement position of the object in the scene can be determined based on equations (3a) to (3d). This removes undesirable shifting of the object in the scene.

What is claimed is:

1. A scene description generating apparatus comprising:
    object extracting means for extracting an object from an input image and for outputting positional information on the extracted object; and
    scene description generating means for generating scene description information about a placement position of the object in a scene based on the positional information output from said object extracting means;
    wherein, when the object is deformed, said scene description generating means refers to the positional information and generates the scene description information in which the object deformation is reflected.

2. A scene description generating apparatus according to claim 1, wherein, when the object is deformed, said scene description generating means refers to the positional information and generates the scene description information in which a shifting component in the input image is removed.

3. A scene description generating apparatus according to claim 1, wherein said object extracting means outputs the width and the height of a region containing the object and the position of the region as the positional information on the object.

4. A scene description generating apparatus according to claim 1, further comprising object encoding means for encoding the object extracted by said object extracting means.

5. A scene description generating apparatus according to claim 1, wherein, when the object extracted by said object extracting means is used as a texture in the scene, said scene description generating means determines, based on the positional information output from said object extracting means, a texture coordinate transformation to be applied to a texture map of the texture to be pasted on a scene object in the scene, and generates the scene description information in accordance with the determination.

6. A scene description generating apparatus according to claim 1, wherein, when the object extracted by said object extracting means is used as a texture, said scene description generating means determines, based on the positional information output from said object extracting means, the size of a scene object in the scene on which the texture is to be pasted, and generates the scene description information in accordance with the determination.

7. A scene description generating apparatus according to claim 1, wherein, when the object extracted by said object extracting means is used as a texture in the scene, said scene description generating means determines, based on the positional information output from said object extracting means, a positional designation of the texture to be pasted on a scene object, and generates the scene description in accordance with the determination.

8. A scene description generating apparatus comprising:
    object extracting means for extracting an object from an input image;
    positional information detecting means for detecting positional information on the object extracted by said object extracting means; and
    scene description generating means for generating, based on the positional information on the object detected by said positional information detecting means, scene description information about a placement position of the object in a scene;
    wherein, when the object is deformed, said scene description generating means refers to the positional information and generates the scene description information in which the object deformation is reflected.

9. A scene description generating apparatus according to claim 8, wherein, when the object is deformed, said scene description generating means refers to the positional information and generates the scene description information in which a shifting component in the input image is removed.

10. A scene description generating apparatus according to claim 8, wherein said object extracting means outputs the width and the height of a region containing the object and the position of the region as the positional information on the object.

11. A scene description generating apparatus according to claim 8, wherein, when the object extracted by said object extracting means is used as a texture in the scene, said scene description generating means determines, based on the positional information output from said object extracting means, a texture coordinate transformation to be applied to a texture map of the texture to be pasted on a scene object in the scene, and generates the scene description information in accordance with the determination.

12. A scene description generating apparatus according to claim 8, wherein, when the object extracted by said object extracting means is used as a texture in the scene, said scene description generating means determines, based on the positional information output from said object extracting means, the size of a scene object in the scene on which the texture is to be pasted, and generates the scene description information in accordance with the determination.

13. A scene description generating apparatus according to claim 8, wherein, when the object extracted by said object extracting means is used as a texture in the scene, said scene description generating means determines, based on the positional information output from said object extracting means, a positional designation of the texture to be pasted on a scene object, and generates the scene description information in accordance with the determination.

14. A scene description generating method comprising:
an object extracting step of extracting an object from an input image and outputting positional information on the extracted object; and
a scene description generating step of generating, based on the positional information output in said object extracting step, scene description information about a placement position of the object in a scene;
wherein, when the object is deformed, the positional information is referred to in said scene description generating step and the scene description information in which the object deformation is reflected is generated.

15. A scene description generating method according to claim 14, wherein, when the object is deformed, the positional information is referred to in said scene description generating step and the scene description information in which a shifting component in the input image is removed is generated.

16. A scene description generating method according to claim 14, wherein, in said object extracting step, the width and the height of a region containing the object and the position of the region are output as the positional information on the object.

17. A scene description generating method according to claim 14, further comprising an object encoding step of encoding the object extracted in said object extracting step.

18. A scene description generating method according to claim 14, wherein, when the object extracted in said object extracting step is used as a texture in the scene, based on the positional information output in said object extracting step, a texture coordinate transformation to be applied to a texture map of the texture to be pasted on a scene object in the scene is determined in said scene description generating step, and the scene description information is generated in accordance with the determination.

19. A scene description generating method according to claim 14, wherein, when the object extracted in said object extracting step is used as a texture in the scene, based on the positional information output in said object extracting step, the size of a scene object in the scene on which the texture is to be pasted is determined in said scene description generating step, and the scene description information is generated in accordance with the determination.

20. A scene description generating method according to claim 14, wherein, when the object extracted in said object extracting step is used as a texture in the scene, based on the positional information output in said object extracting step, a positional designation of the texture to be pasted on a scene object is determined in said scene description generating step, and the scene description information is generated in accordance with the determination.

21. A scene description generating method comprising:
an object extracting step of extracting an object from an input image;
a positional information detecting step of detecting positional information on the object extracted in said object extracting step; and
a scene description generating step of generating, based on the positional information detected in said positional information detecting step, scene description information about a placement position of the object in a scene;
wherein, when the object is deformed, the positional information is referred to in said scene description generating step and the scene description information in which the object deformation is reflected is generated.

22. A scene description generating method according to claim 21, wherein, when the object is deformed, the positional information is referred to in said scene description generating step and the scene description information in which a shifting component in the input image is removed is generated.

23. A scene description generating method according to claim 21, wherein, in said object extracting step, the width and the height of a region containing the object and the position of the region are output as the positional information on the object.

24. A scene description generating method according to claim 21, wherein, when the object extracted in said object extracting step is used as a texture in the scene, based on the positional information output in said object extracting step, a texture coordinate transformation to be applied to a texture map of the texture to be pasted on a scene object in the scene is determined in said scene description generating step, and the scene description information is generated in accordance with the determination.

25. A scene description generating method according to claim 21, wherein, when the object extracted in said object extracting step is used as a texture in the scene, based on the positional information output in said object extracting step, the size of a scene object in the scene on which the texture is to be pasted is determined in said scene description generating step, and the scene description information is generated in accordance with the determination.

26. A scene description generating method according to claim 21, wherein, when the object extracted in said object extracting step is used as a texture in the scene, based on the positional information output in said object extracting step, a positional designation of the texture to be pasted on a scene object is determined in said scene description generating step, and the scene description information is generated in accordance with the determination.

27. A recording medium for causing a scene description generating apparatus for generating scene description information on an object to execute a computer-readable program, said computer-readable program comprising:

an object extracting step of extracting the object from an input image and outputting positional information on the extracted object; and a scene description generating step of generating, based on the positional information output in said object extracting step, the scene description information about a placement position of the object in a scene;

wherein, when the object is deformed, the positional information is referred to in said scene description generating step and the scene description information in which the object deformation is reflected is generated.

28. A recording medium for causing a scene description generating apparatus for generating scene description information on an object to perform a computer-readable program, said computer-readable program comprising:

an object extracting step of extracting the object from an input image;

a positional information detecting step of detecting positional information on the object extracted in said object extracting step; and a scene description generating step of generating, based on the positional information on the object detected by said positional information detecting step, the scene description information about a placement position of the object in a scene;

wherein, when the object is deformed, the positional information is referred to in said scene description generating step and the scene description information in which the object deformation is reflected is generated.

* * * * *